(12) United States Patent
Sands, III et al.

(10) Patent No.: US 10,774,944 B2
(45) Date of Patent: Sep. 15, 2020

(54) ELECTRONIC ACTUATOR FOR ANHYDROUS AMMONIA EMERGENCY SHUT OFF VALVES

(71) Applicant: Squibb Taylor, Inc., Dallas, TX (US)

(72) Inventors: William Henry Sands, III, Dallas, TX (US); William Henry Sands, Jr., Dallas, TX (US); Brently Craig Wilkerson, Dallas, TX (US); Patrick Lee Hodges, Dallas, TX (US); William Browning Washington, IV, Dallas, TX (US); Jack Jay Potts, Dallas, TX (US)

(73) Assignee: Squibb Taylor, Inc., Dallas, TX (US)

( * ) Notice: Subject to any disclaimer, the term of this patent is extended or adjusted under 35 U.S.C. 154(b) by 16 days.

(21) Appl. No.: 16/243,076

(22) Filed: Jan. 8, 2019

(65) Prior Publication Data

US 2020/0011445 A1    Jan. 9, 2020

Related U.S. Application Data

(60) Provisional application No. 62/695,594, filed on Jul. 9, 2018.

(51) Int. Cl.
| | |
|---|---|
| *F16K 31/06* | (2006.01) |
| *F16K 35/16* | (2006.01) |
| *F16K 31/46* | (2006.01) |
| *F16K 31/10* | (2006.01) |
| *F16K 35/00* | (2006.01) |

(52) U.S. Cl.
CPC .......... *F16K 31/0682* (2013.01); *F16K 31/10* (2013.01); *F16K 31/46* (2013.01); *F16K 35/16* (2013.01); *F16K 35/00* (2013.01)

(58) Field of Classification Search
CPC ...... F16K 31/0682; F16K 35/16; F16K 31/46; F16K 31/10; F16K 35/00
See application file for complete search history.

(56) References Cited

U.S. PATENT DOCUMENTS

| | | | | | |
|---|---|---|---|---|---|
| 1,596,968 | A | * | 8/1926 | Hansen | F16K 31/10 251/76 |
| 1,808,765 | A | * | 6/1931 | Dean | F16K 31/10 137/613 |
| 2,218,606 | A | * | 10/1940 | Foster | F16K 31/10 74/2 |

(Continued)

*Primary Examiner* — Umashankar Venkatesan
(74) *Attorney, Agent, or Firm* — Ferguson Braswell Fraser Kubasta PC; Elizabeth Philip Dahm; Kelly J. Kubasta

(57) ABSTRACT

In various implementations, an electronic actuator may be coupled to a valve to provide the ability to shut off anhydrous ammonia flow through the valve (e.g., in emergencies). The valve may be coupled to anhydrous ammonia tanks, such as nurse tanks and/or storage tanks. The electronic actuator may include a handle and a bracket. The handle and the bracket may include at least two attractive components that are magnetically attracted to each other upon application of an electric current and the valve may be open. When the electric current is cut, the attractive components of the handle and the bracket may not be magnetically attracted to each other and the valve may be shut off. A controller (e.g., a switch) may be coupled to the electronic actuator to allow control of the electric signal to the electronic actuator.

20 Claims, 18 Drawing Sheets

(56) References Cited

U.S. PATENT DOCUMENTS

| | | | | |
|---|---|---|---|---|
| 2,223,292 | A * | 11/1940 | Maxon | F16K 31/10 251/69 |
| 2,850,258 | A * | 9/1958 | Lazich | F16K 31/10 251/77 |
| 2,936,997 | A * | 5/1960 | Nickells | F16K 31/10 251/54 |
| 3,584,650 | A * | 6/1971 | Macaulay | F16K 31/0682 137/625.65 |
| 3,591,988 | A * | 7/1971 | Price | B24B 41/06 451/246 |
| 4,945,579 | A * | 8/1990 | Husting | E03C 1/232 251/68 |
| 6,752,373 | B1 * | 6/2004 | Rudy | B05B 1/26 239/512 |
| 2012/0161046 | A1 * | 6/2012 | Tsai | F16K 31/0682 251/129.01 |

* cited by examiner

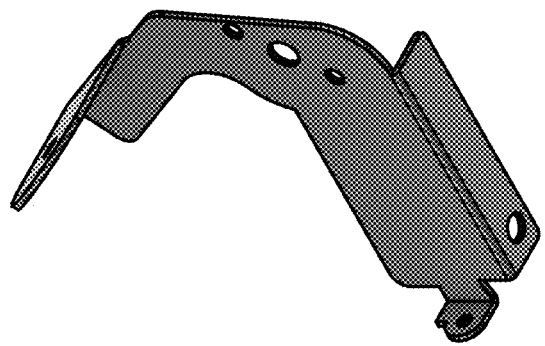
FIG. 14A
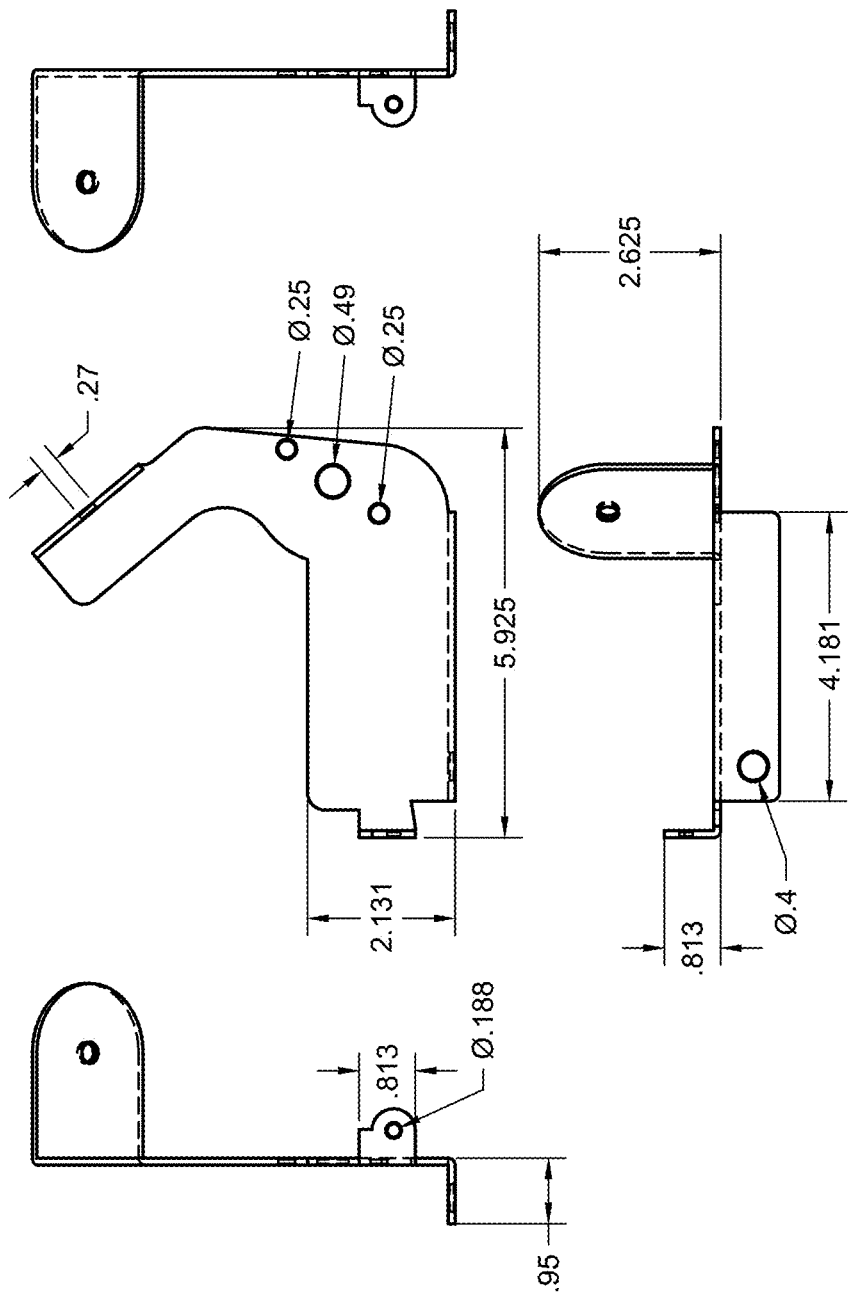
FIG. 14B
FIG. 14C
FIG. 14D
FIG. 14E

ELECTRONIC ACTUATOR FOR ANHYDROUS AMMONIA EMERGENCY SHUT OFF VALVES

CROSS-REFERENCE TO RELATED APPLICATION

This application claims the benefit of U.S. Provisional Patent Application 62/695,594, filed on Jul. 9, 2018 and entitled "Electronic Actuator for Anhydrous Ammonia Emergency Shut Off Valves", which is incorporated by reference for all purposes.

TECHNICAL FIELD

The present invention relates to an electronic actuator for valves in anhydrous ammonia emergency shut off valves.

BACKGROUND

Anhydrous ammonia storage and transport are dangerous due to the toxicity of ammonia gas and the explosion risks of anhydrous ammonia. However, anhydrous ammonia is widely used as a nitrogen fertilizer. Even during regular operations, such the transfer of anhydrous ammonia from storage tanks to nurse tanks and the application of anhydrous ammonia to fields, there is a risk of injury to operators due to contact and inhalation. Additionally, anhydrous ammonia use in enclosed spaces (e.g., refrigerant applications), can cause fire and/or explosions. Thus, balancing safe storage and transport with expense and practicality is a common struggle.

Currently, anhydrous ammonia storage tanks include valves that can be manually actuated to shut off a valve in an emergency and excess flow valves. However, manual valves are difficult to reach emergency scenarios (e.g., operators may become quickly overcome by noxious gases during a leak) and/or may require an uninjured participant to manually actuate the valve. Excess flow valves are often not activated, and thus do not provide a fail safe in long pipe runs and are sensitive to valve sizing (e.g., over and under sizing valves can cause performance failures).

SUMMARY

In various implementations, an electronic actuator may be coupled to a valve to provide an emergency shut off valve assembly. A switch, which may be remote to the valve, may trigger the emergency shut off and cause the valve to close. Thus, a remote worker (e.g., in the field or not in the field) can close valve(s) in an emergency, during maintenance, and/or for any other appropriate purpose. Use of the electronic actuator (e.g., electromagnetic) may increase safety during use, storage, and/or transport of anhydrous ammonia.

In various implementations, an anhydrous ammonia nurse tank valve assembly may include an anhydrous ammonia valve, an electronic actuator, and a switch to operate the electronic actuator. The anhydrous ammonia valve may include comprises at least one open position and a closed position. The closed position may inhibit flow of the anhydrous ammonia through the valve. The valve may include a spring (e.g., a spring actuated valve). The electronic actuator may be coupled to the valve (e.g., an anhydrous ammonia valve), and may be capable adjusting the position of the valve.

In various implementations, an electronic actuator may include a bracket, a handle, and one or more locking members. The bracket may be coupleable to the valve (e.g., via a fasteners). The bracket may include an attractive member, such as an electromagnet. The electromagnet may be coupled to an electrical source. The electromagnet may extend in a first direction away from a body of the bracket. The bracket may include a first flange extending away from the body of the bracket such that the first flange and the electromagnet are not disposed on the same side of the bracket. The first flange may include a first opening capable of receiving at least a portion of a first lock. Disposing the first lock at least partially in the first opening may not inhibit movement of the handle (e.g., the first opening may act as a resting position for the lock). The handle may include a connection portion and a stem. The connection portion may be pivotably coupleable to the valve. The handle may be rotatable from a first position in which the valve is disposed in one of the open positions to a second position in which the valve is disposed in the closed position. A spring of the valve may be extended when the handle opens the valve (e.g., a normal closed valve with a spring). The stem may extend from the connection portion of the handle. The stem may include a first end proximate the connection portion, a second opposing end, a first side proximate the bracket; a second opposing side, and a third side disposed between the first side and the second side. The handle may include an attractive component (e.g., a magnet) extending from the second side of the body of the handle. The attractive component (e.g., magnet) may be disposed on the stem between the second end of the stem and the connection portion. The attractive component may couple with the electromagnet in the bracket to inhibit closure of the valve, when the electromagnet is magnetic (e.g., when power is supplied to the electromagnet). The handle may include locking mechanism. The handle may include a second flange extending from the third side and disposed between the connection portion of the handle and the second end of the stem. The second flange may have a length such that when the handle is disposed in the first position, at least a portion of the second flange extends beyond the body of the bracket. The second flange may include a locking member that includes a second opening disposed through the second flange. The second opening may receive at least a portion of the first lock. The second opening of the second flange may configured (e.g., oriented, sized, etc.) such that disposing a first lock at least partially in the second opening allows the first lock to contact the bracket and thus inhibit the handle from moving to the first position. By inhibiting the handle from moving to the first position from a second position, the valve may be locked (e.g., to inhibit theft and/or leaks). The electronic actuator may include another a locking member. The locking member may be coupled to the bracket. The locking member may include a spring loaded latch that may receive at least a portion of the handle. The spring loaded latch may be capable of releasing the handle to allow the handle to move to the first position (e.g., when a force, such as a force directly exerted on the latch and/or a force exerted on the handle and transferred in part to the latch, is exerted on the latch that exceeds the force applied to the latch by the spring of the latch). When the attractive component of the handle and the electromagnet of the bracket are coupled, the valve may be disposed in the open position. When power is removed from the electromagnet, the spring of the valve may rotate the handle to the second position and close the valve. The spring loaded latch may move to receive the handle when the spring of the valve rotates the handle to the second position due to the release of the attractive member of the handle by the electromagnet and/or by force of the spring of the spring load latch receive and inhibit movement of the handle.

Implementations may include one or more of the following features. The attractive component may include at least one ferromagnetic material. The electronic actuator may be coupled to the valve of an anhydrous ammonia nurse tank. The valve may comprise an excess flow valve. The electronic actuator may be coupled to the valve of an anhydrous ammonia storage tank. The electronic actuator may include a switch coupled to the electromagnet. The switch may include on and off positions. The on position may allow power to be provided from the electrical source to the electromagnet to allow the electromagnet to be magnetic. The off position may inhibit power from the electrical source to be provided to the electromagnet and allows the electromagnet to be non-magnetic. The handle of the electronic actuator may include a gripper extending from the stem of the handle. The stem may be configured to receive the gripper on the first side or the second side of the stem, in some implementations.

In various implementations, an electronic actuator may be coupled to an anhydrous ammonia valve to shut off flow to the valve and/or inhibit inadvertent closure of the valve. The electronic actuator may include a bracket, a handle, and one or more locking mechanisms. The bracket may be coupled to the valve. The bracket may include first attractive member extending in a first direction away from a body of the bracket. The handle may include a connection portion pivotably coupleable to the valve. The handle may be rotatable from a first position in which the valve is disposed in one of the open positions to a second position in which the valve is disposed in the closed position. A spring of the valve may be extended when the handle opens the valve. The handle may include a stem extending from the connection portion of the handle. The stem may include a first end proximate the connection portion of the handle, a second opposing end, a first side proximate the bracket, a second opposing side, and a third side disposed between the first side and the second side. The handle may include a second attractive component extending from the second side of the stem of the handle. The second attractive component may be disposed between the first end and the second end of the stem. The handle may include a first flange extending from the third side and disposed between the first end and the second end of the stem. The first flange may have a length such that when the handle is disposed in the first position, the first flange at least partially extends beyond the body of the bracket. The first flange may include a first opening disposed through the first flange. The first opening may receive the at least a portion of a first lock. The first opening of the first flange of the bracket may be configured such that disposing a first lock at least partially in the first opening allows the first lock to contact the bracket and inhibit the handle from moving to the first position. Thus, the valve may be locked (e.g., to inhibit leaks and/or theft). The first attractive component and/or the second attractive component may include an electromagnet. The electromagnet may be coupled to an electrical source such that the electromagnet is magnetic when power is delivered from the electrical source to the electromagnet. When power is provided to the electromagnet, the second attractive component of the handle and the first attractive of the bracket are coupled and the valve is disposed in the open position. When the second attractive component couples with the first attractive component of the bracket closure of the valve may be inhibited. When power is removed from the electromagnet, the second attractive component of the handle and the first attractive component of the bracket may be uncoupled, and a spring of the valve may rotate the handle to the second position and close the valve.

Implementations may include one or more of the following features. The electronic actuator may include an additional flange extending away from the body of the bracket such that the additional flange and the first attractive component are not disposed on the same side of the bracket. The additional flange may include a second opening capable of receiving at least a portion of the first lock. Disposing the first lock at least partially in the second opening may not inhibit movement of the handle. The electronic actuator may include a gripper extending from the stem of the handle. The gripper may be coupled to the first side or the second side of the stem. The electronic actuator may include a switch coupled to the electromagnet. The switch may include on and off positions. The an on position may allow power to be provided from the electrical source to the electromagnet to allow the electromagnet to be magnetic. The off position may inhibit power from the electrical source to be provided to the electromagnet and may allow the electromagnet to be non-magnetic. The switch may be remote to the valve and electronic actuator. The valve may be closed prior to the handle fully rotating to the second position from the first position. The first attractive component and/or second attractive components may include ferromagnetic material. The electronic actuator may include a locking member coupled to the bracket. The locking member may include a spring loaded latch may inhibit release of a handle received by the spring loaded latch. The spring loaded latch may releasing the handle to allow the handle to move to the first position. The spring loaded latch may move to receive the handle when the spring of the valve moves the handle to the second position due to the release of the attractive member of the handle by the electromagnet. The force of the spring of the spring load latch may cause the latch to receive (e.g., in a recess of the latch) and inhibit (e.g., via the force of the spring of the latch retaining the latch in the position) movement of the handle. The electronic actuator may be coupled to the valve of an anhydrous ammonia nurse tank.

In various implementations, operations of a nurse tank may include opening and/or closing the valve to allow and/or inhibit release of anhydrous ammonia. Operating a nurse tank valve may include removing power from an electromagnet of an electronic actuator such that the electromagnet and the attractive member are uncoupled. The electronic actuator may include a bracket and a handle. The bracket may be coupled to the valve and/or may include an electromagnet extending in a first direction away from a body of the bracket. The handle may include a connection portion pivotably coupleable to the valve. The handle may rotate from a first position in which the valve is disposed in one of the open positions to a second position in which the valve is disposed in the closed position. A spring of the valve may be extended when the handle opens the valve. The handle may include a stem extending from the connection portion of the handle. The stem may include a first end proximate the connection portion of the handle, a second opposing end, a first side proximate the bracket, a second opposing side, and a third side disposed between the first side and the second side. The handle may include an attractive component extending from the second side of the stem of the handle. The attractive component may be disposed between the first end and the second end of the stem. The handle of the electronic actuator may be allowed to rotate from the first position to the second position once the electromagnet and the attractive component are uncoupled. Uncoupling the electromagnet and the attractive component may remove the force extending the spring of the valve and may cause the spring of the valve rotate the handle by acting on a connection member of the valve that is coupled to the handle. The valve assembly may be locked by disposing a lock at least partially in a first opening disposed through a first flange of the electronic actuator. The first flange may extend from a third side of the stem and may be disposed between the first end and the second end of the stem. The first flange may have a length such that when the handle is disposed in the first position, the first flange at least partially extends beyond the body of the bracket. Disposing a first lock at least partially in the first opening may allow the first lock to contact the bracket and may inhibit the handle from moving to the first position.

Implementations may include one or more of the following features. Allowing the handle of the electronic actuator to rotate from the first position to the second position may include allowing a latch of a spring loaded locking member to rotate in a first direction to allow the handle to move to the second position. A force exerted by the spring of the valve may move the handle to contact the latch and cause the rotation in the first direction. The latch may be automatically rotated in a second opposing direction once the handle is in the first position via a spring of the spring load locking member. The latch may receive the handle and inhibit movement of the handle from the second position. In some implementations the valve may be opened by: releasing a handle of an electronic actuator from a spring loaded locking member by rotating the locking member, wherein the electronic actuator is coupled to a valve of an anhydrous ammonia nurse tank; rotating the handle of the electronic actuator to first position from a second position, wherein when the handle is in the first position the valve is open, and wherein the valve is closed when the handle is in the second position; and providing power to an electromagnet of the electronic actuator such that the electromagnet couples with the attractive member of the electronic actuator. Coupling the electromagnet and the attractive member of the electronic actuator may inhibit rotation of the handle and closure of the valve. In some implementations, a first lock may be disposed in a resting position in the electronic actuator. The electronic actuator may include an additional flange extending away from the body of the bracket such that the additional flange and the first attractive component are not disposed on the same side of the bracket. The additional flange may include second opening capable of receiving at least a portion of the first lock. Disposing the first lock at least partially in the second opening of the additional flange of the bracket may not inhibit movement of the handle.

The details of one or more implementations are set forth in the accompanying drawings and the description below. Other features, objects, and advantages of the implementations will be apparent from the description and drawings.

BRIEF DESCRIPTION OF THE DRAWINGS

For a more complete understanding of this disclosure and its features, reference is now made to the following description, taken in conjunction with the accompanying drawings, in which:

FIG. 6B illustrates a partial cutaway view of an implementation of the example closed valve assembly illustrated in. FIG. 6A.

FIG. 14A illustrates a perspective view of an implementation of a bracket of an example an electronic actuator.

FIG. 14B illustrates a front view of the implementation of the example bracket illustrated in FIG. 14A.

FIG. 14C illustrates a side view of the implementation of the example bracket illustrated in FIG. 14A.

FIG. 14D illustrates a back view of the implementation of the example bracket illustrated in FIG. 14A.

FIG. 14E illustrates a second side view of the implementation of the example bracket illustrated in FIG. 14A.

Like reference symbols in the various drawings indicate like elements.

DETAILED DESCRIPTION

Figure 1:
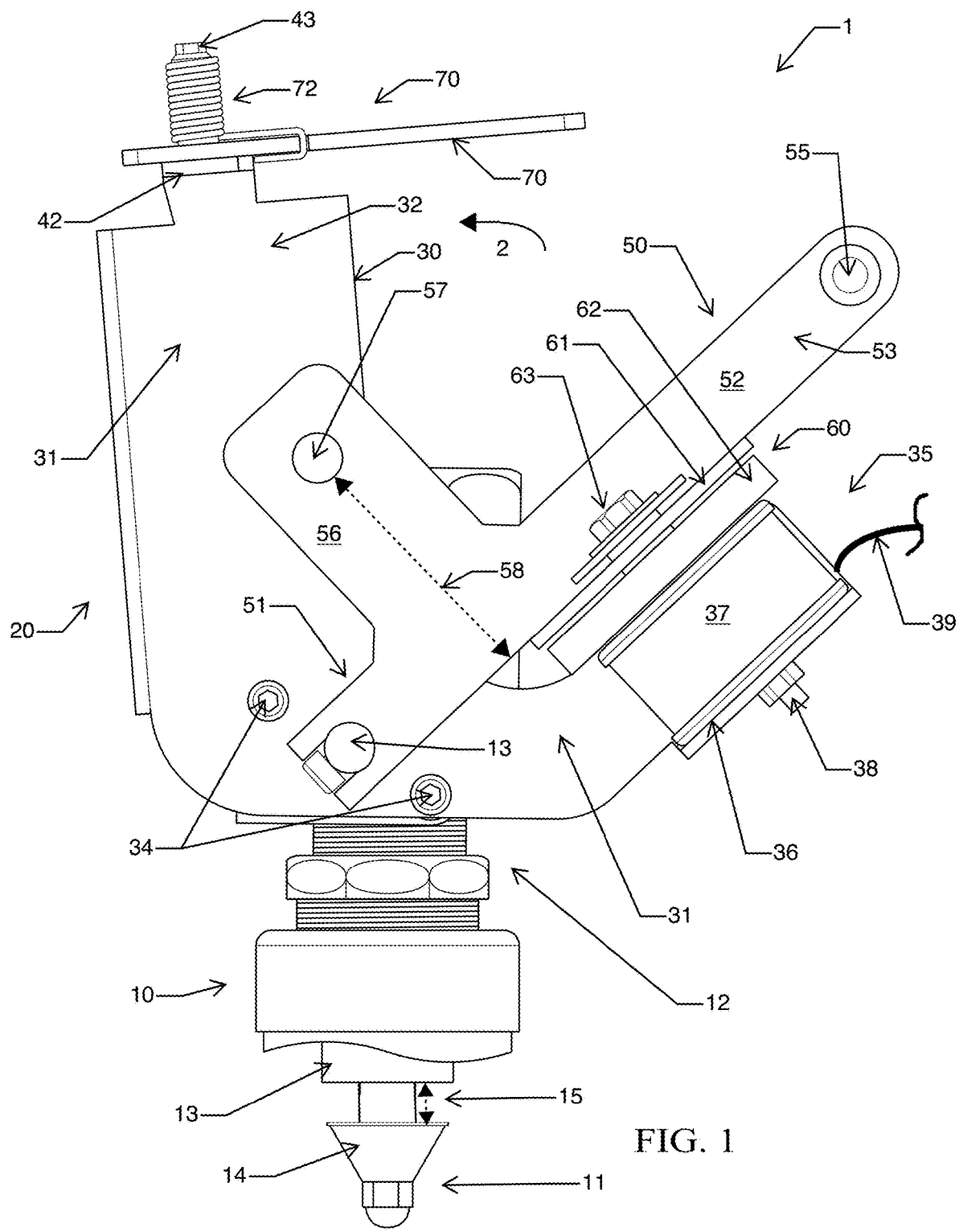
FIG. 1 illustrates a front view of an implementation of an example valve assembly in an open position.

Anhydrous ammonia has wide industrial and agricultural use; however, there is a high risk of operator injury due to contact and/or inhalation with anhydrous ammonia from use, due to leaks, and/or mishandling. Anhydrous ammonia can cause respiratory issues, burns, and has explosive potential. Often, when anhydrous ammonia leaks from nurse tanks, operators are quickly overcome as the leaking anhydrous ammonia quickly vaporizes and overtakes the atmosphere proximate the leak. Operators may have respiratory issues, become incapacitated, and/or have trouble reach the nurse tank to control the leak. Leaks also potentially can damage agricultural crops (e.g., in over application due to leaks). Thus, an electronic actuator capable of for use with anhydrous ammonia valves, that inhibits leaks during transport, when the nurse tank is not in use, and/or that allows remote emergency shut off may inhibit injury to operators, inhibit damage to the environment, and/or reduce costs (e.g., due to leaked resources, damaged agriculture, and/or liability).

Due to the chemical and physical properties of anhydrous ammonia, specialty valves are utilized when storing, transporting, and controlling fluid flow of anhydrous ammonia. The valves may be safety valves that control flow (e.g., operational flow and/or excess flow) and/or provide emergency shut off. In some implementations, excess flow valves may be used, but due to the nature of anhydrous ammonia transportation and/or application may not inhibit leaks (e.g., the amount of anhydrous ammonia being released may not be sufficient to close the excess flow valve; however, the amount may be great enough to cause injure individuals and/or damage agriculture). Thus, the described actuator may be utilized with excess flow valves and/or other types of control valves.

An anhydrous ammonia valve may be coupled to a tank, which is at least partially filled with anhydrous ammonia. For example, the tank may include storage tanks, nurse tanks, and/or any other appropriate type of tank. The valve may connect the tank(s) (e.g., directly and/or indirectly via a coupler) to one or more hoses. The hose may allow fluid to flow from the tank via the valve to application devices (e.g., toolbars, applicators, etc. to fertilize a field) and/or to another tank (e.g., from a storage tank to a nurse tank or vice versa; on a truck; etc.).

The anhydrous ammonia valve may include an electronic actuator that is capable of adjusting the position (e.g., open and/or closed) of the valve. For example, the anhydrous ammonia valve may provide an emergency shut off of the fluid flow through the valve. Thus, if leakage is identified, a hose becomes disconnected, equipment is damaged that causes leakage, and/or if injury to an individual occurs, the valve may be shut down via a switch of the electronic actuator.

In various implementations, the electronic actuator may include one or more locking members. The locking members may inhibit inadvertent and/or unauthorized opening of a valve. For example, transportation of nursing tanks on fields may be bumpy (e.g., as opposed to transporting tanks on paved roads) and the bumps may jostle or otherwise alter the position of a handle to open or slightly open the valve and cause leaks. This scale of leak may not cause an excess flow valve to automatically close the valve and inhibit leakage. However, a locking member may inhibit a handle from moving to an open position and thus inhibit the valve from opening during transport of a tank (e.g., a nursing tank). In addition, locking member(s) may inhibit theft. Concerns about theft are important not just due to the economic loss caused by stolen compounds, but also due to damage to fields and individuals from leaking (e.g., due to damage due to theft and/or failure to close valves after theft), environmental hazards caused by leaking anhydrous ammonia in an area that may cause proximate water source contamination, and/or damage to fields and individuals during the theft itself. Contact and inhalation of anhydrous ammonia and compounds from degrading anhydrous ammonia can injure operators and others in the vicinity of a leak (e.g., since the anhydrous ammonia may quickly vaporize and cause a localized concentration that suffocates and/or otherwise causes respiratory distress or damage). Thus, inhibiting leakage and/or theft via the electronic actuator may increase user satisfaction, increase compliance with regulations (e.g., clean water, soil, etc.), reduce expenses, increase agricultural yields (e.g., due to inhibiting damage caused by leaks), and inhibit injury to individuals.

In various implementations, a valve may have at least one open position and a closed position. Valves for use with anhydrous ammonia are commonly and commercially available (see e.g., valves available from Squibb Taylor (Dallas, Tex.)). For example, a valve may allow multiple open positions to adjust the amount of fluid allowed to flow through the valve. The valve may be a normally closed valve with a spring (e.g., such that the spring may pull and/or maintain a valve in a closed position unless a force is acting upon the spring). An electronic actuator may be coupled to the valve to control the position in which a valve is disposed. The electronic actuator may allow emergency shut off of the fluid flow from the valve, in some implementations.

Figure 2:
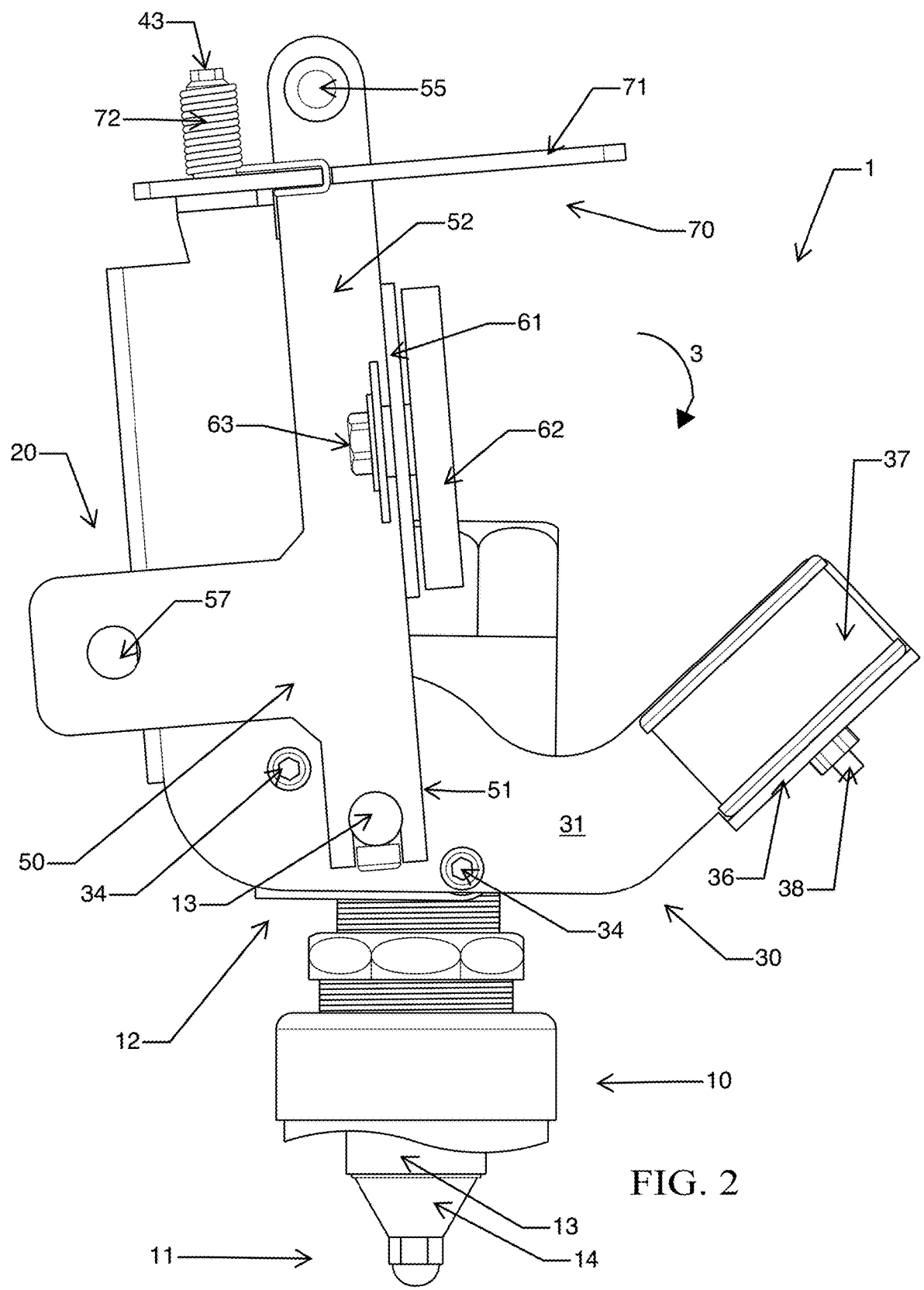
FIG. 2 illustrates a front view of an implementation of the example valve assembly of FIG. 1 in a closed position.
Figure 3:
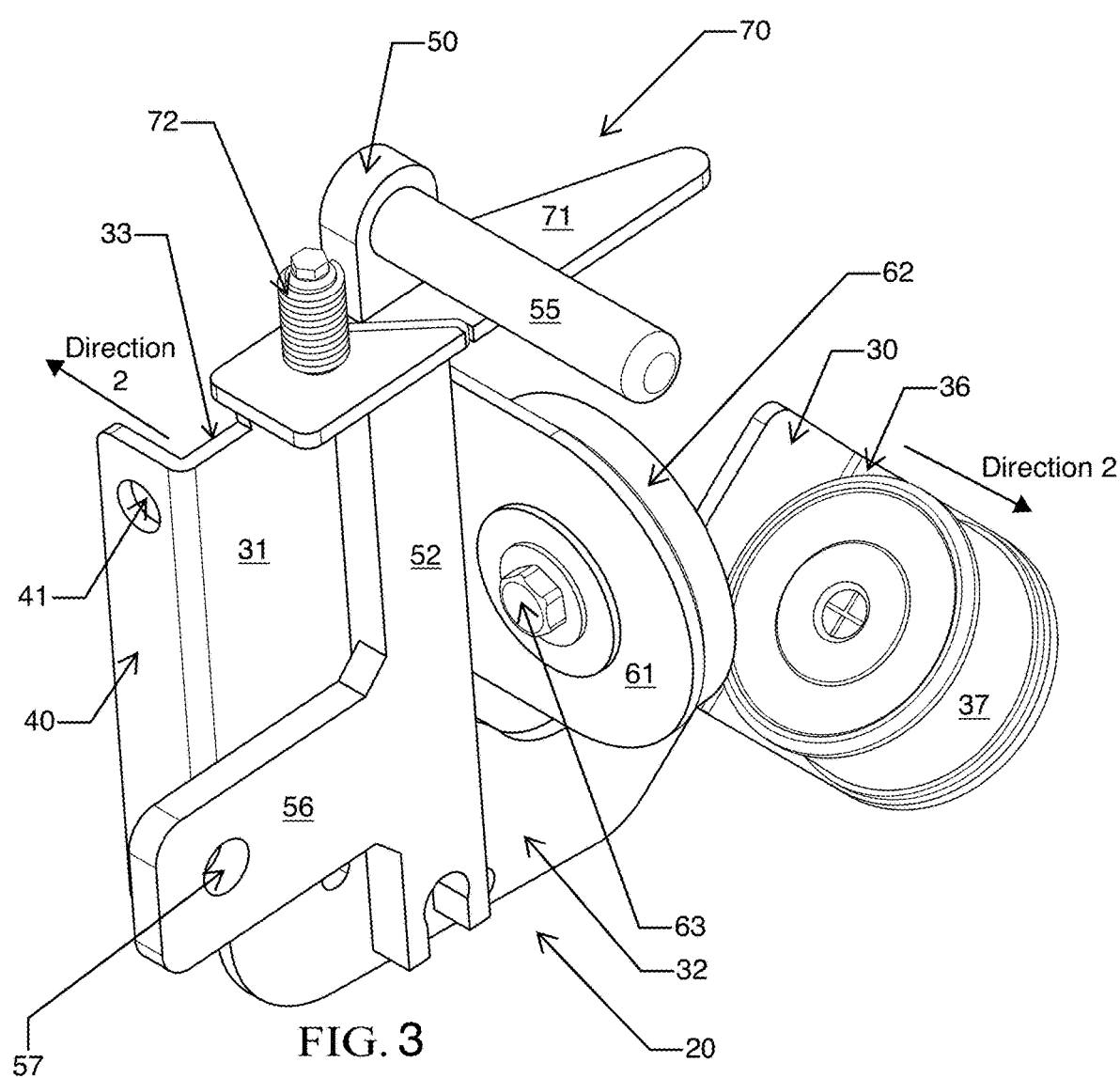
FIG. 3 illustrates a perspective view of an implementation of an example electromagnetic actuator.

FIG. 1 illustrates an implementation of an example valve assembly 1, which includes a valve 10 and an electronic actuator 20, in an open position and FIG. 2 illustrates the example valve assembly 1 in a closed position. FIG. 3 illustrates an implementation of an example electronic actuator 20. As illustrated, the valve assembly includes a valve 10 and an electromagnetic actuator 20. The valve 10 may have a first end 11 that may be coupled to and/or disposed at least partially in a tank (e.g., nurse tank) and a second end 12 coupled to the actuator 20. When the valve 10 is open, as illustrated in FIG. 1, a gap 15 may reside between the first part 13 of the valve disk and the second part 14 of the valve disk to allow fluid to flow through the gap. When the valve 10 is closed, as illustrated in FIG. 2, the first part 13 of the valve disk may contact the second part 14 of the valve disk to inhibit fluid passage through the valve. The valve 10 may include a spring (not shown) that closes and/or maintains the valve in a closed position unless a force acts on the valve and/or spring to open the valve, in some implementations.

A second end 12 of the valve 10 may be coupled to one or more hose(s) (e.g., indirectly or directly) and/or the electronic actuator 20. The valve may include an opening in line with the opening to the tank and/or at an angle. The valve may include multiple openings at multiple angles (e.g., 180, 90, 270, 70, etc.) can be coupled to hoses and/or capped, in some implementations. For example, one or more hoses may be coupled to the valve to transport fluids from the tank to another tank and/or to field applicators. The valve may include a member 13 extending through the valve 10 and the electronic actuator 20 may adjust the position of the valve via the member 13. For example, the member 13 may rotate to adjust the position of the valve from closed (e.g., as illustrated in FIG. 2) and an open position (e.g., as illustrated in FIG. 1). As illustrated, rotation of the member 13 in direction 2 closes the valve and rotation of the member 13 in direction 3 opens the valve.

Figure 4A:
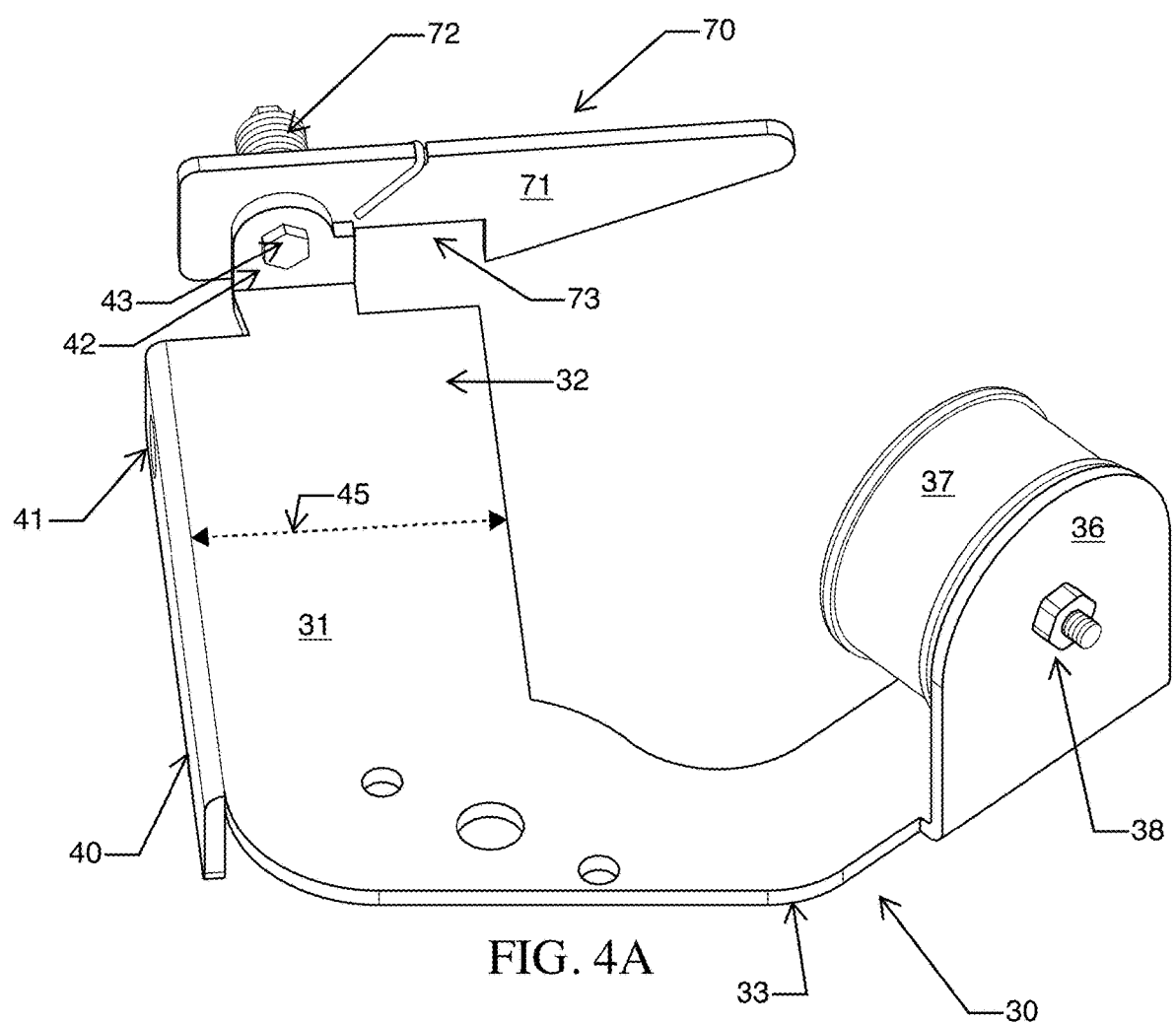
FIG. 4A illustrates a first perspective view of an implementation of an example bracket for an electromagnetic actuator.
Figure 4B:
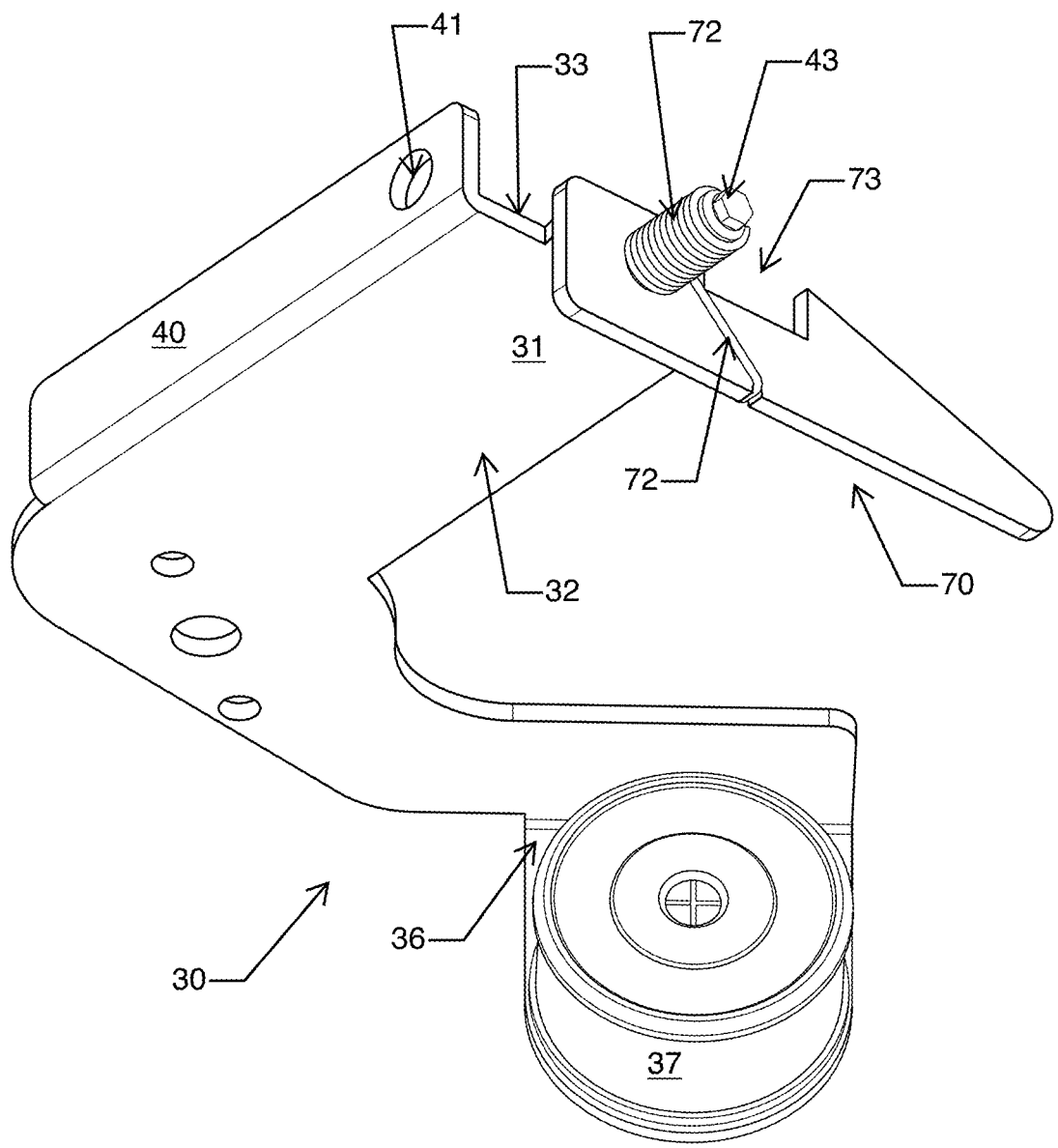
FIG. 4B illustrates a second perspective view of an implementation of the example bracket for the electromagnetic actuator.

As illustrated in FIGS. 1-2, the electronic actuator 20 may be coupled to the valve 10 and may be capable of adjusting the position of the valve. The electronic actuator 20 may include a bracket 30 and a handle 50. FIG. 3 illustrates an implementation of an example actuator. FIGS. 4A and 4B illustrate front and back views, respectively of an example bracket. The bracket 30 may include a body 31 with a first side 32 and a second opposing side 33. The bracket 30 may include an opening (as illustrated in FIG. 4B) such that member 13 of the valve may extend through the bracket. The opening may be larger than the member 13 such that a rotation of member 13 may not cause a rotation of bracket 13. The bracket 13 may include openings capable of receiving one or more fasteners 34. Fastener(s) 34 may couple the bracket to the valve 10.

The bracket may include an attractive component, such as an electromagnetic component 35. The electromagnetic component may include a material that is magnetic (e.g., creates magnetic fields) when electricity is provided to the electromagnetic component and is not magnetic (e.g., does not create magnetic fields) when electricity is removed (e.g., cut, switched off, etc.) from the electromagnetic component. In some implementations, a valve may require a force to act upon the valve (e.g., member 13) to open the valve. The electromagnetic component may include a first setting in which the electromagnetic component is magnetic (e.g., when electricity is provided to the electromagnetic component) and thus may be capable of inhibiting a spring of the valve from closing the valve and/or maintain the position of the valve. The electromagnetic component may include a second setting in which the electromagnet may not be magnetic or have some magnetism but not enough to inhibit the spring of the valve from closing the valve (e.g., or vice versa—opening the valve if the spring of the valve acts to keep the valve open). As illustrated, the electromagnetic component 35 may extend in a first direction (see e.g., direction 1 in FIG. 3) from the first side 32 of the body 31 of the bracket. In some implementations, the electromagnetic component may include a plate 35 extending from the first side 32 of the body 31 of the bracket 30. An electromagnet 37 may be coupled to the plate 36 via a fastener 38. Power may be provided to the electromagnet 37 via wiring 39. For example, the wiring may couple the electromagnet to a power source, such as a battery and/or a power source associated with a vehicle (e.g., via coupler such as a cigarette lighter adapter and/or USB connector in a tractor, a car battery, a tractor battery, etc.). Since the electronic actuator may not require a large amount of power, the power source may not inhibit operation(s) of the vehicle while drawing power to supply the electronic actuator and/or the electronic actuator may be powered by a portable battery.

Figure 4C:
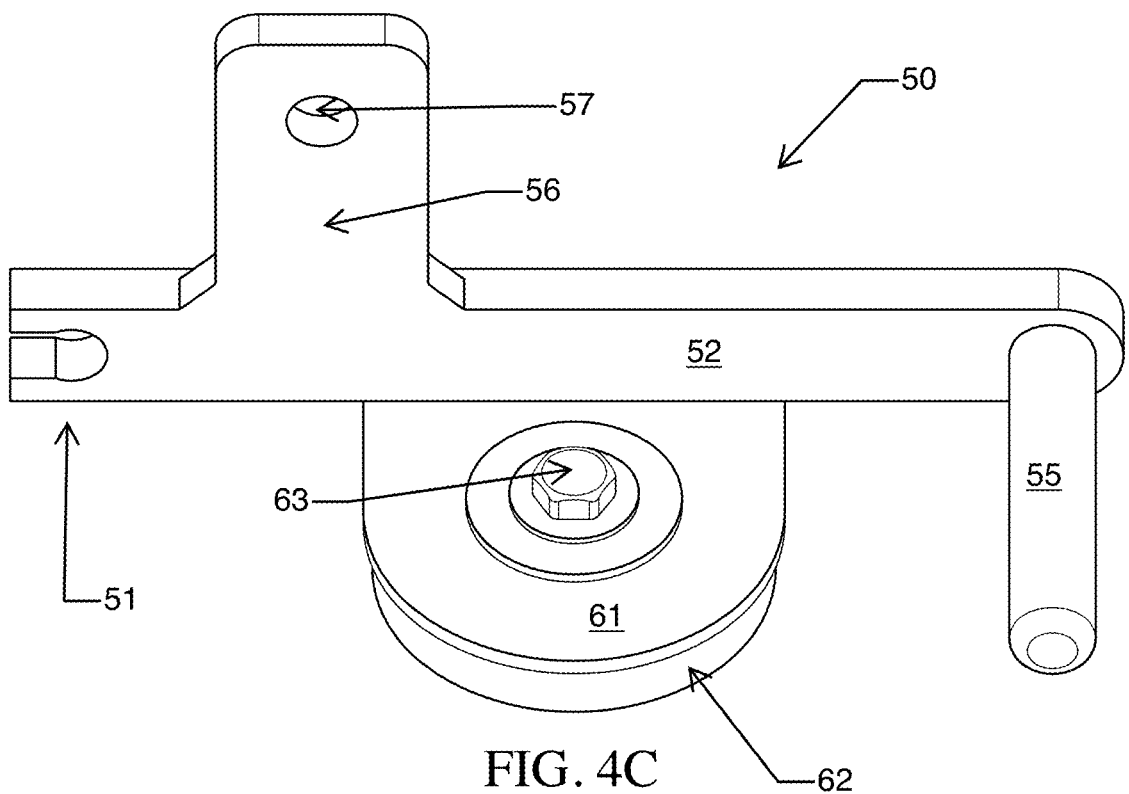
FIG. 4C illustrates a first perspective view of an implementation of an example handle for an electromagnetic actuator.
Figure 4D:
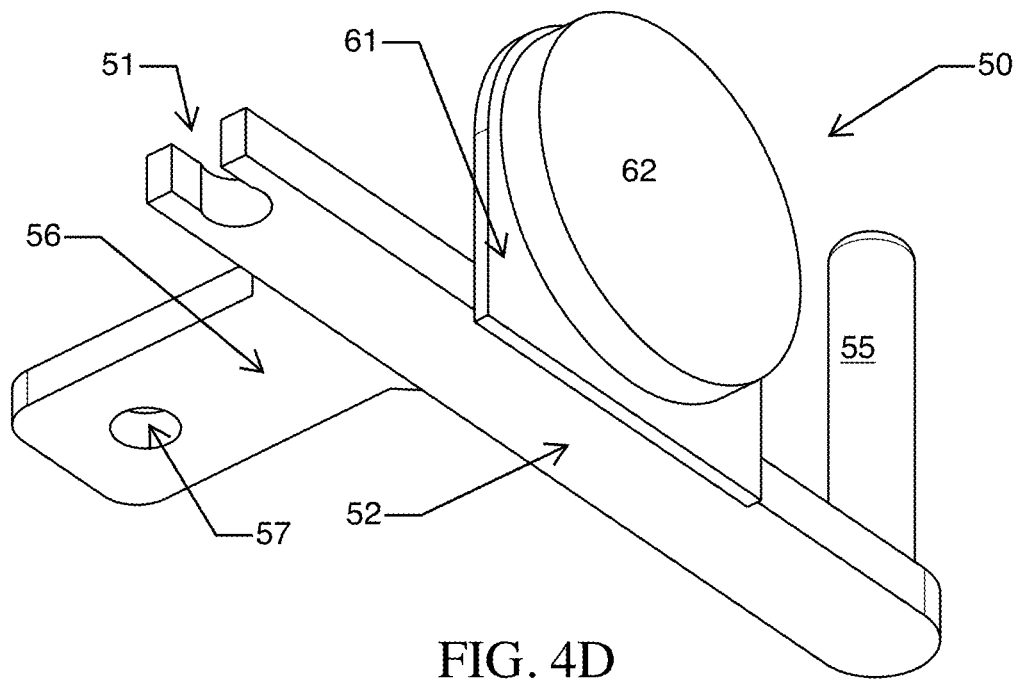
FIG. 4D illustrates a second perspective view of an implementation of the example handle for the electromagnetic actuator.

The electromagnetic component 20 may include a handle 50. FIGS. 4C and 4D illustrate front and back views, respectively of an example handle. As illustrated in FIGS. 1-3, 4C and 4D, the handle 50 may be coupled at a coupling portion 51 to the valve. As illustrated, the handle may include a recess disposed proximate an end of the handle to receive at least a portion of the member 13 of the valve. A fastener may secure member 13 in the recess of the handle. The coupling portion may couple with member 13 such that rotation of the handle rotates member 13, which adjusts a position (e.g., open and/or closed) of the valve. The handle may include a stem 52 with a first side 53 and a second opposing side 54. A gripper 55 may be coupled to a first side 53 of the stem 51. The gripper may have any appropriate size, shape, textured surface (e.g., to facilitate gripping of the gripper), and/or coating (e.g., to inhibit rust, facilitate gripping, improve appearance, visually identify the gripper, etc.).

The handle may include an attractive component 60 between the connecting part 51 of the handle and the gripper 55. The attractive component 60 may include a material that is attracted to magnetic fields and/or attracted (e.g., temporarily and/or permanently) to the attractive component 35 of the bracket 30. The attractive component 60 may be magnetic, in some implementations. The attractive component 60 may magnetically couple with the electromagnetic component 35 of the bracket 20 when the electromagnetic component 35 has power (e.g., such that it is magnetic). The attractive component 60 may include a ferromagnetic material and/or rare earth magnetic material, in some implementations. In some implementations, the attractive component 60 of the handle may include a plate 61 to which a ferromagnetic material 62 is coupled via a fastener 63.

In various implementations, the handle may be utilized to open a valve (e.g., manually, semi-automatically, and/or automatically). The handle may be moved (e.g., such that member 13 rotates) from a closed position (e.g., first position) to an open position (e.g., second position) by moving the handle in direction 3. Power may be provided to the electromagnetic component, which causes the attractive component to be magnetically coupled to the electromagnetic component of the bracket. The coupling between the attractive component 60 and the electromagnetic component 35 may maintain the handle in the open position and/or maintain the valve in an open position (e.g., when the electromagnet is on). The open valve may be used to provide fluid for any appropriate purpose, such as delivering anhydrous ammonia from a tank (e.g., nurse tank) via hoses to field applicators, to fill other tanks, etc. The magnetic attraction between the handle and the bracket may be greater than a force applied by a spring of a valve in a spring valve (e.g., in which the spring closes the valve) to allow the valve to remain open, during use. By utilizing electromagnetic attraction to keep the valve open, operators may be discouraged from wiring open the valve during use since the strength which with the bracket and handle are coupled is strong. Wiring the valve open is sometimes utilized to inhibit the valve from accidentally closing while on bumpy fields; however, wiring a valve open can inhibit safety features from operating correctly. Thus, safety during operations may be increased since accidental closure may also be inhibited by using the electronic actuator.

The magnetic attraction between the handle and the bracket when the electromagnet is on (e.g., power is provided to the electromagnet) may inhibit a user from manually uncoupling the handle and the bracket and/or inhibit accidental closure during use (e.g., from bumps in a field jostling the handle during application), in some implementations. The electromagnet may be turned off to release the handle from the bracket (e.g., the attractive component of the handle may be uncoupled from the electromagnetic component of the bracket). In some implementations, the valve may automatically close when the electromagnet is turned off. For example, a spring in a spring valve may cause the valve to close once the force keeping the valve open (e.g., the electromagnetic force between the electromagnet 35 and the attractive component 60) is removed. Thus, when the electromagnet is turned off, the spring of the valve may act and draw the valve closed, which causes the member 13 and/or the handle coupled to member 13 to rotate to a closed position.

Figure 5:
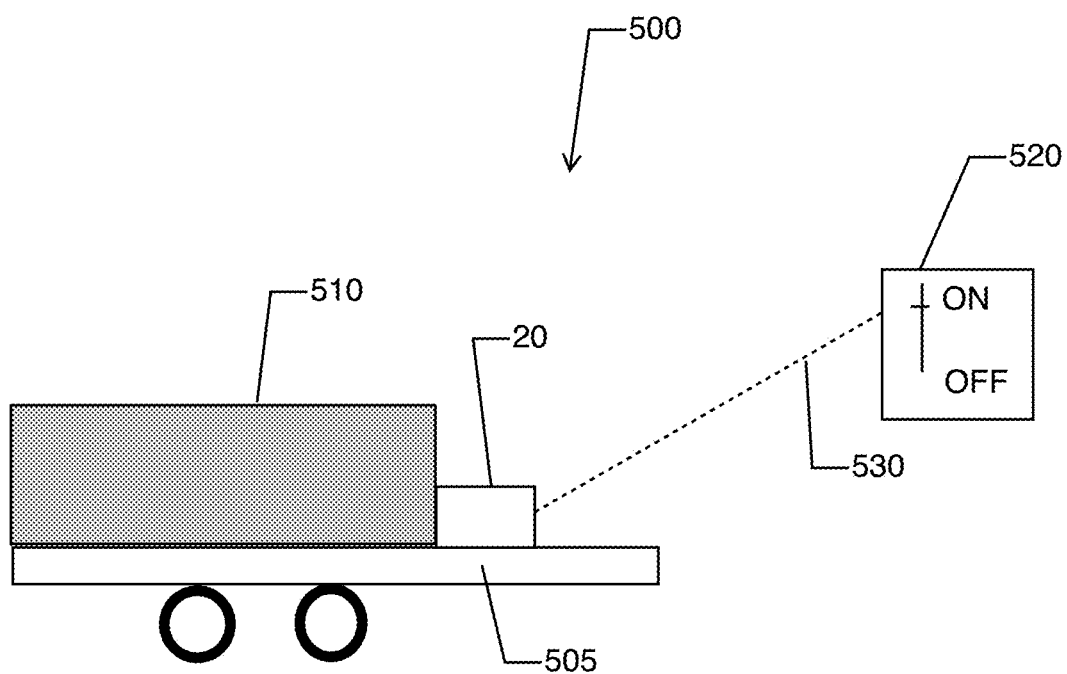
FIG. 5 illustrates an implementation of an example portion of a valve assembly system.

A switch may control the power provided to the electromagnetic component (e.g., turn the electromagnet on and/or off). The switch may be remote to the valve in some implementations (e.g., to increase safety). FIG. 5 illustrates an implementation of a portion 500 of an example nursing tank system. As illustrated, the nurse tank trailer 505 may include a nurse tank 510 and an electronic actuator 20 coupled to the nurse tank. A switch may be coupled to the electronic actuator via a connection 530, such as a wired connection and/or wireless connection. The switch may be remote to the nurse tank, such as in the truck, with an operator, in an office, etc. Thus, a user may not need to approach the valve and/or tank, which may be leaking dangerous compounds (e.g., exposure to which may be hazardous and/or which may have a risk of ignition). As another example, if a vehicle a user is driving overturns, the user and/or a remote user can activate the switch (e.g., while the user remains in the vehicle). Thus, injured drivers and/or remote users can still shut off the valve, which increases safety when compared with commercially available pull lines that can get tangled in field accident and are not available over long distances. In some operations, users may not be able to safely approach the leak (e.g., in a tank and/or line), for example since exposure may cause the operator to have respiratory problems and/or pass out; thus, a remote switch may allow the valve to be closed while minimizing contact with the hazardous material. The switch may be wired and/or wirelessly (e.g., WiFi, Bluetooth, etc.) coupled to the electronic actuator (e.g., electromagnet) and/or the power source (e.g., which is coupled to the electromagnet). The switch may be any appropriate switch, such as a button, a lever, and/or may be a wireless switch that may be activated by an application on a phone or other computer. For example, a switch box may be wired from the electromagnet and may be placed in a vehicle (e.g., driving nursing tanks) and/or any other appropriate location such as an office (e.g., proximate storage tanks).

In some implementations, the valve may operate as an emergency shut off valve and automatically close when power is cut off from the electromagnetic component. For example, the valve may close based on the activation of a switch coupled to the electromagnet and/or the power source of the electromagnet. The electromagnetic component may be otherwise turned off, for example, by line breakage between the electromagnet and the power source (e.g., in emergency scenarios such as a vehicle and/or tank rolling and cutting the lines, tangled lines, etc.). When power is removed from the electromagnet, the magnetic attraction between the electromagnet bracket and the attractive component of the handle ceases and the spring of the valve acts on the handle (e.g., via member 13) to pivot the handle in direction 2 and move the handle to the closed position and thus the valve in the closed position. Since the described valves are utilized with anhydrous ammonia, the emergency shut off valve feature of the described valves may facilitate compliance with regulations, industry standards, and/or generally increase safety since the valve defaults to a closed position rather than open position.

In various implementations, the electronic actuator may include one or more locking members. Locking members may inhibit leakage, inadvertent opening of a valve, inadvertent closing of a valve during use, and/or theft. Locking member(s) of the electronic actuator may facilitate compliance with regulations (e.g., government, insurance, etc.) and/or industry standards. Locking member(s) may decrease costs (e.g., by decreasing losses due to theft, inadvertent leaking, damage due to leaks, liability to operators due to leaks or malfunctions, etc.)

The electronic actuator may include more than one locking member, in some implementations. A first locking member may include one or more flanges on the electronic actuator. As illustrated in FIGS. 1-3 and 4C-6, the bracket may include a first flange 40. The first flange 40 may extend in an opposite direction as the electromagnetic component. As illustrated, the electromagnetic component may extend in direction 1 and the first flange may extend in direction 2 from the bracket. The first flange 40 may include a first opening 41 extending through the first flange. The first opening 41 may be configured to receive at least a portion of a lock (e.g., a portion of the shackle of a lock). Positioning the lock in the first opening may not inhibit the movement of the handle of the electronic actuator. In some implementations, the electronic actuator may not include the first flange and/or first opening. For example, the electronic actuator may or may not include a different member onto which the lock may be coupled without inhibiting movement of the handle (e.g., the lock may be removed from the electronic actuator when not locking the valve and/or electronic actuator handle).

The handle may include a second flange 56 that extends from the stem between the connecting part 51 (e.g., proximate a first end of the stem) and the gripper 55 (e.g., proximate the second opposing end of the stem). The second flange 56 may extend from the stem from a third side between the first side 52 and the second side 53 of the handle. In some implementations, the flange may be disposed in a plane approximately perpendicular to the plane of the plate onto which the electromagnet is coupled. The second flange 56 may include a second opening 57 that extends through the second flange. The second opening 57 may be configured to receive at least a portion of a lock (e.g., a portion of the shackle of a lock).

The body of the bracket 20 may be designed such that when the handle is in an open position, the second opening 57 is not accessible, as illustrated in FIG. 1. For example, the gap between the handle and the bracket proximate the second opening may not allow a user to dispose a lock through the second opening. As illustrated, in some implementations, the length 45 of an arm of the bracket may be approximately the same as distance 80 from an edge of the stem 52 to the second opening 57 of the handle 50 such that once the handle moves from the closed valve position the second opening becomes at least partially occluded by the arm of the bracket. Thus, a user would be inhibited from opening a lock disposed in the second opening, opening the valve (e.g., by moving the handle of the electronic actuator), and then repositioning the lock in the second opening while the valve is open. Since positioning a lock in the second opening of the second flange while the valve is open may interfere with the emergency shut off feature of the electronic actuator of the valve (e.g., by inhibiting full closure of the valve), operational safety of the valve assembly may be increased by inhibiting access to the second opening of the handle when the handle is moving to an open position and/or is in an open position.

When the valve is open (e.g., and the handle is in the first position as illustrated in FIG. 1), the lock may be positioned in the first opening in the first flange 40, which may act as a resting location, when the lock is removed from the handle. By resting the lock in the first opening 41, a user may not lose the lock while operating the valve but may not inadvertently inhibit rotation of the handle (e.g., which may thus interfere with the emergency shut off capabilities of the electronic actuator). In some implementations, the electronic actuator may not include a feature to provide a resting location to a lock not in use.

Figure 6A:
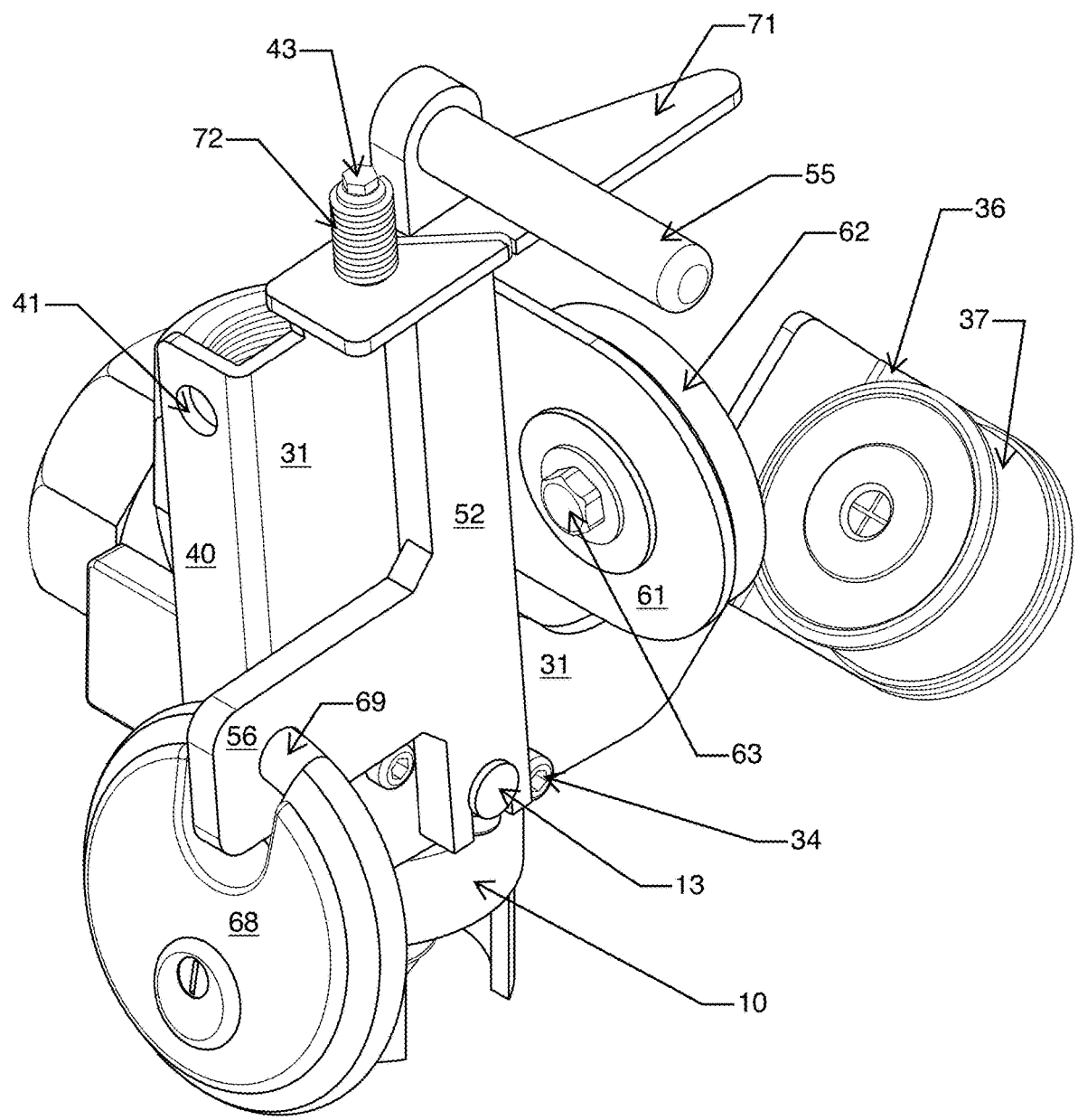
FIG. 6A illustrates an implementation of an example of a locked valve assembly.
Figure 6B:
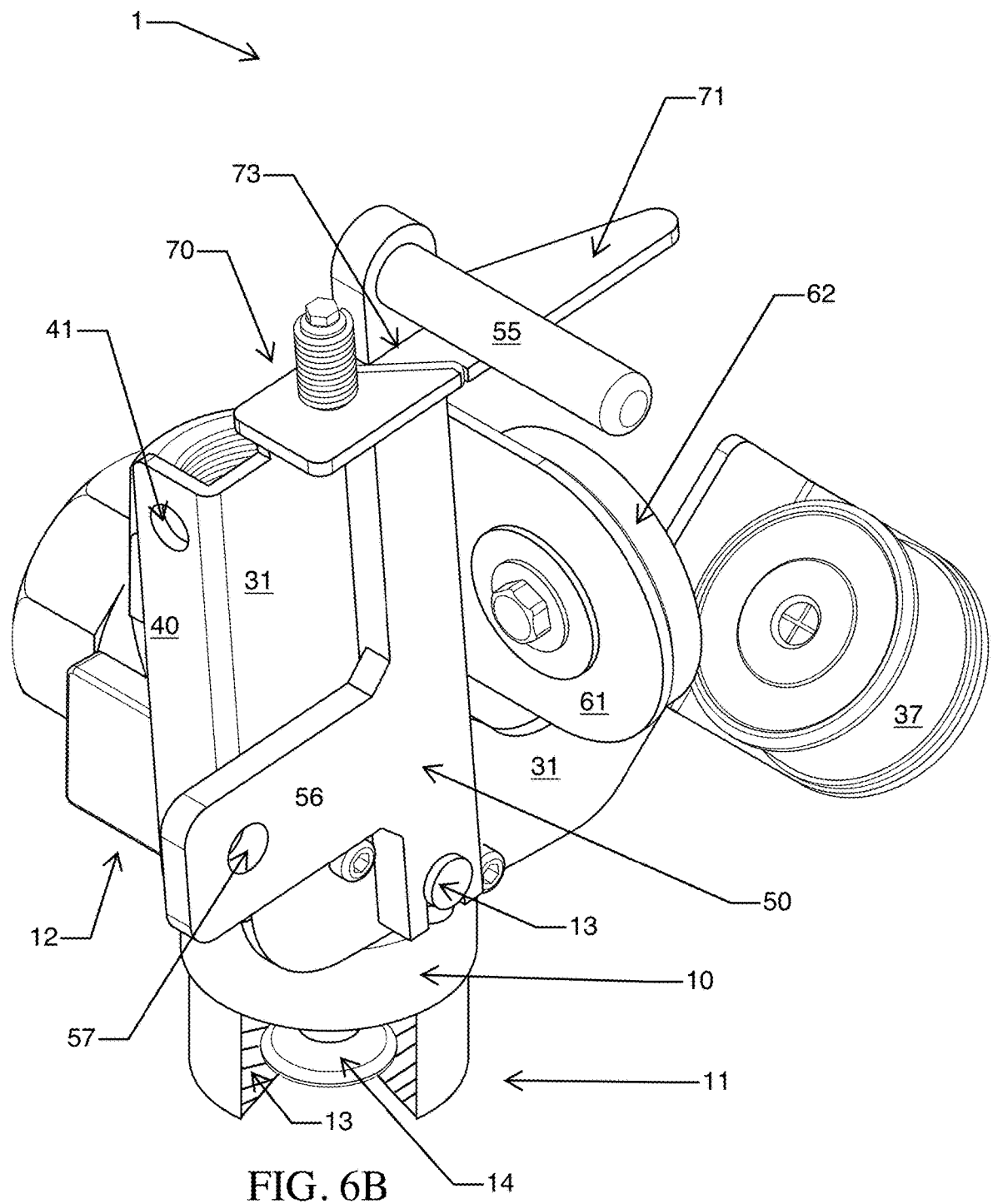

FIG. 6A illustrates an implementation of the valve assembly in which the valve is in the closed position and FIG. 6B illustrates a partial cutaway view of the valve assembly illustrated in FIG. 6A. When the valve and handle are in a closed position, the second opening 57 may be capable of receiving a lock, as illustrated in FIG. 2 and FIG. 6A. The lock may be removed from the first opening 41 of the bracket 30 and disposed in the second opening in the handle to lock the valve (e.g., inhibit movement of the valve to an open position). Since the handle operation is not substantially inhibited by placement of the lock in the first opening, the lock may reside in the first opening until the operator locks the valve assembly, in some implementations.

Figure 11:
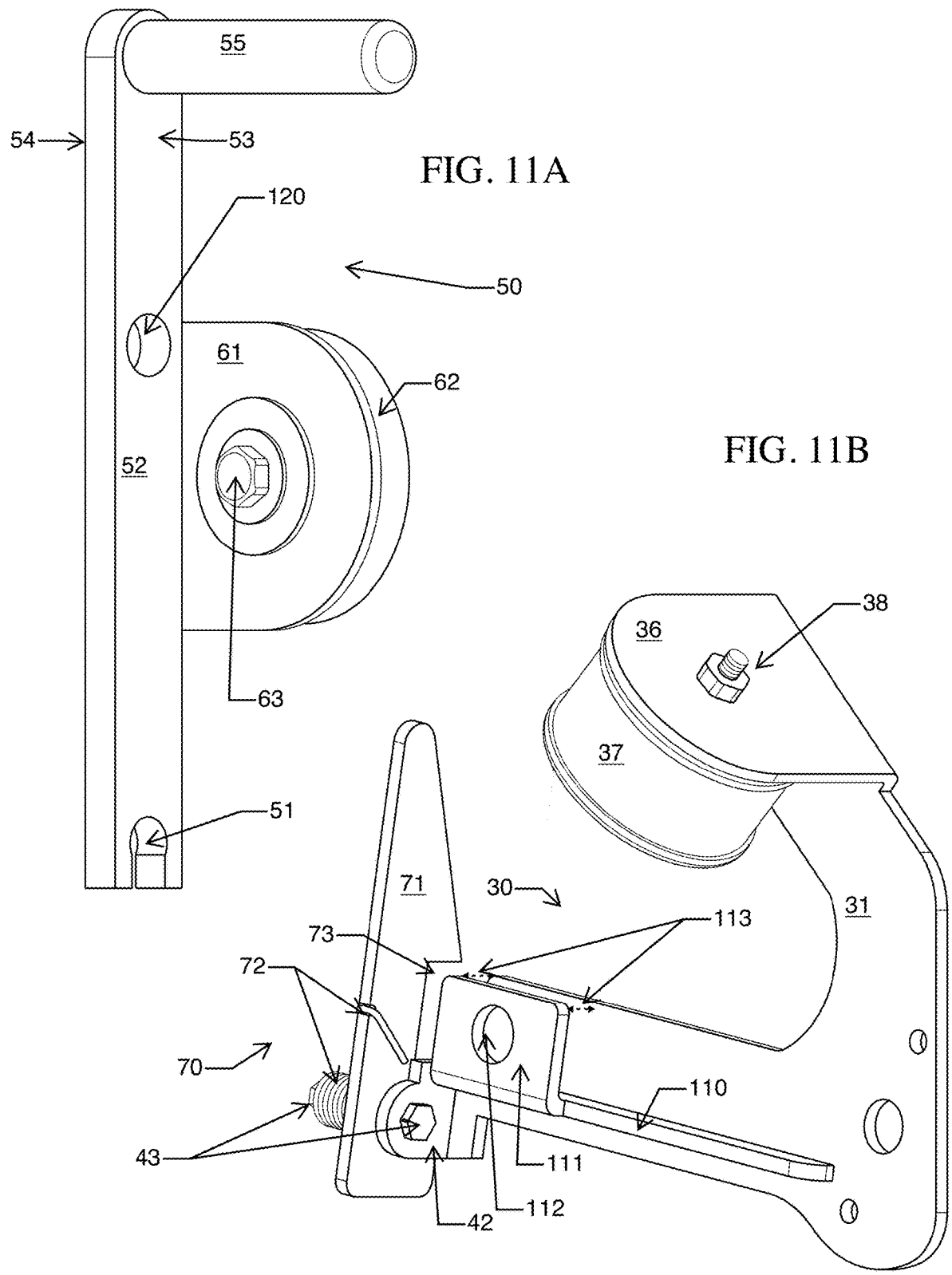
FIG. 11A illustrates a first perspective view of an implementation of an example handle for an electromagnetic actuator.
FIG. 11B illustrates a first perspective view of an implementation of an example portion of the electromagnetic actuator that includes a bracket and a second locking member.

The lock may be closed (e.g., locked) to secure and/or lock the valve. A lock may include a shackle that can pass through the opening and thus lock the valve (e.g., movement of the valve). When the lock is disposed in the second opening, the rotation of the handle may be inhibited. For example, a portion of the lock (e.g., the shackle of the lock) may contact the bracket and inhibit movement of the handle from the closed position. The lock may be key, combination, a pin, zip tie, and/or any other appropriate type of lock and may inhibit unauthorized access to the contents of the nurse tank and/or inadvertent opening of the valve. The lock may allow a user to determine if the lock has been opened since locking the valve (e.g., a zip tie may be cut or removed, a lock may record last opening, etc.). As illustrated in FIGS. 5 and 11, a lock may be selected such that cutting off the lock may be difficult or cumbersome. For example, the shackle may not extend greatly past the opening, limiting the amount of shackle available to cut through with bolt cutters, in some implementations.

In some implementations, the electronic actuator may include a second locking member in addition to and/or in place of the first locking member. As illustrated, a second locking member 70 may be coupled proximate an end of the bracket 20. The bracket 20 may include a coupling member 42 (e.g., opening) and a fastener 43 may couple the bracket and the locking member 70 via the coupling member 42. The second locking member 70 may include a spring-loaded latch. The second locking member 70 may include a latch 71 that extends from a coupling portion proximate the bracket and a spring 72 that may or may not be coupled to the fastener 43. The latch 71 may include a recess 73 configured to receive at least a portion of the handle (e.g., stem). The spring 72 of the locking member 70 may inhibit movement of the handle received by the latch. A force, greater than the force applied by the spring 72, may be applied, by a user, to release the handle of the electronic actuator from the latch. For example, the latch may be rotated in direction 3 to release the handle from the latch 71 and dispose the handle, and thus the valve, in an open position. To close the valve, the handle may be pivoted to a closed position and the latch may be rotated in direction 3 to allow the handle to be disposed in a predetermined position (e.g., closed position) such that when the latch is released, the handle is received by the latch to lock the handle. In some implementations, the latch may be configured such that the latch may rotate in direction 3 by application of a predetermined force (e.g., a force greater than that applied by the spring) to the latch by the handle pivoting to the closed position. The spring may be selected such that the force applied by the spring is overcome by the force of the handle pivoting into the closed position in an emergency shut off (e.g., when the power source is removed from the electromagnet and the spring in the valve applies a force to the handle via connection member 13 to pivot the handle to a closed position, the force of this movement displaces the latch to allow the handle to be disposed in a closed position). The latch may automatically rotate, due to the spring 72, in a direction opposite direction 3 once the handle is in the closed position and/or once a force is removed from the latch.

The second locking member may inhibit leakage due to inadvertent opening of the valve. For example, when a nurse tank is driven (e.g., prior to and/or after application), in areas (e.g., fields, dirt roads, etc.) the paths may be bumpy when compared to paved roads. The movement of the nurse tank even on smooth roads may cause vibration and/or jostling of valve. The second locking member may inhibit movement of the handle by retaining the handle with the latch. A user may utilize the second locking member with or without the first locking member when driving between application sites, when driving between storage tanks and applications sites, when theft concerns are minimal, etc.

The first and/or second locking member may facilitate disposition of the handle in the closed position to increase safety and inhibit inadvertent leaks (e.g., from failure to fully close a valve). For example, the second opening of the first locking member may be occluded or partially occluded when the valve is not fully closed, which may facilitate identification of a not fully closed valve. As another non-limiting example, the latch may not clasp when the handle is not in the closed position to facilitate identification of a not fully closed valve. The force from the spring of the second locking member may further move the handle to the fully close the valve, in some implementations. The first and/or second locking member may be easy to operate and may thus increase user satisfaction with the valve. In some implementations, the valve may close prior to the handle being latched by the second locking position.

Thus, using one or more locking members may inhibit theft, leakage, and/or inadvertent failures to close a valve.

Figure 12:
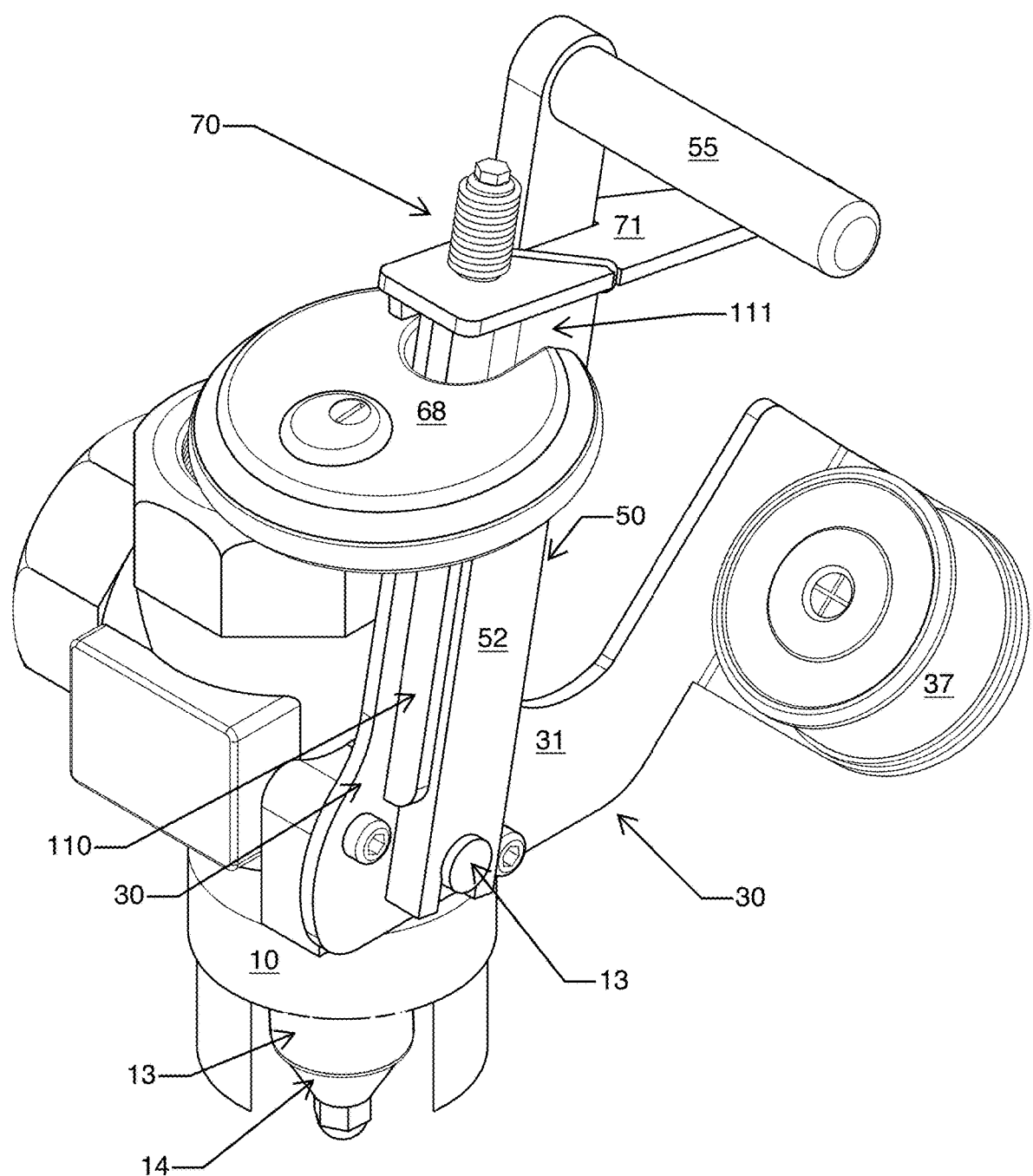
FIG. 12 illustrates an implementation of an example of a locked valve assembly.
Figure 13:
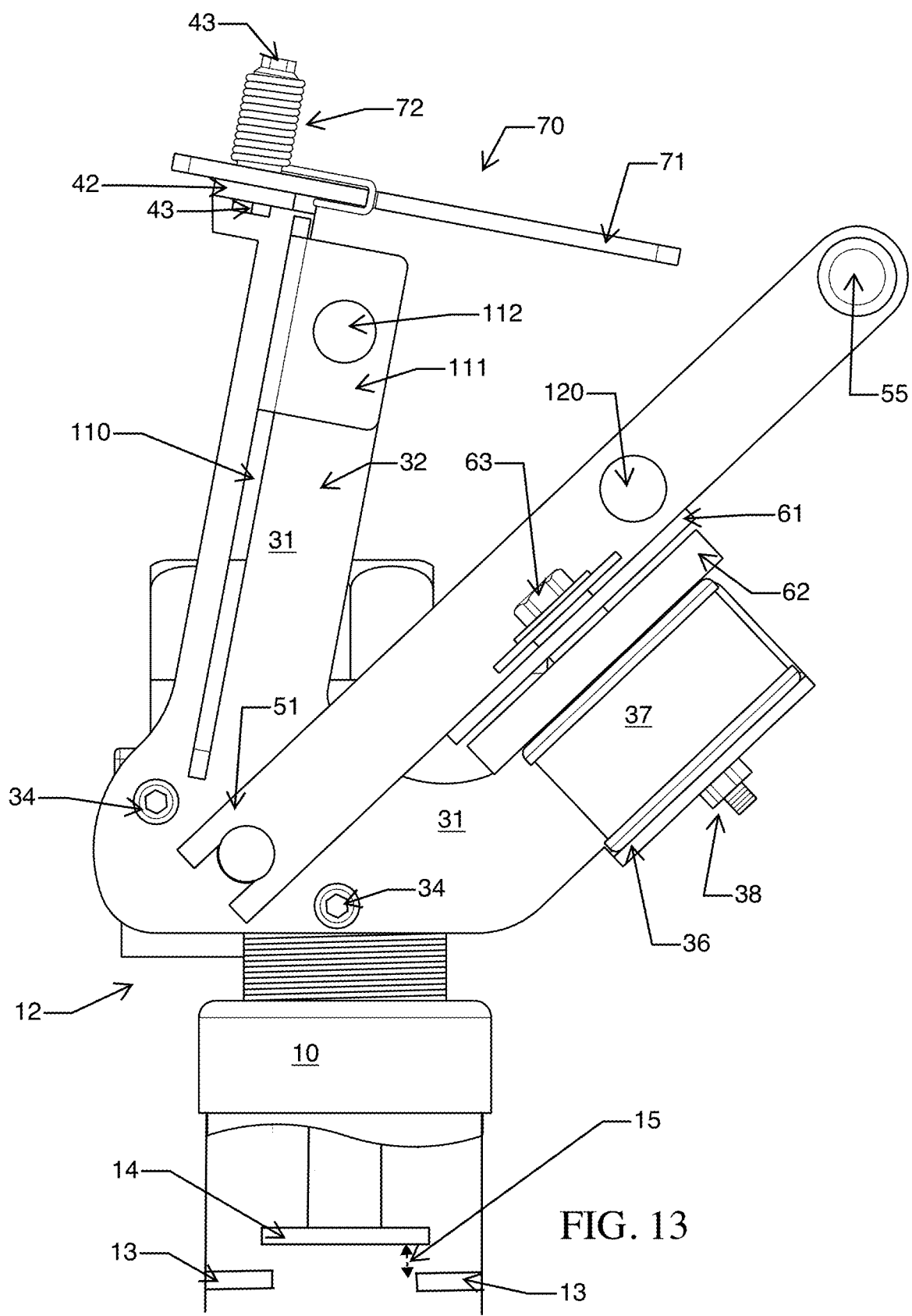
FIG. 13 illustrates a front view of an implementation of an example valve assembly in an open position.
Figure 15C:
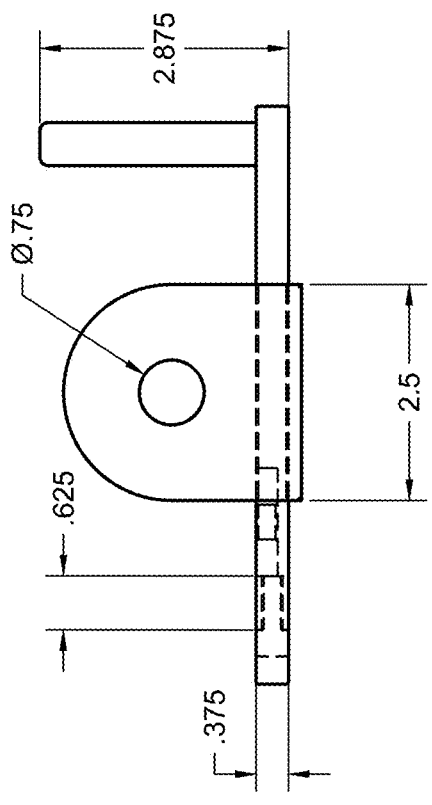
FIG. 15C illustrates a first side view of the implementation of the example handle illustrated in FIG. 15A.
Figure 15D:
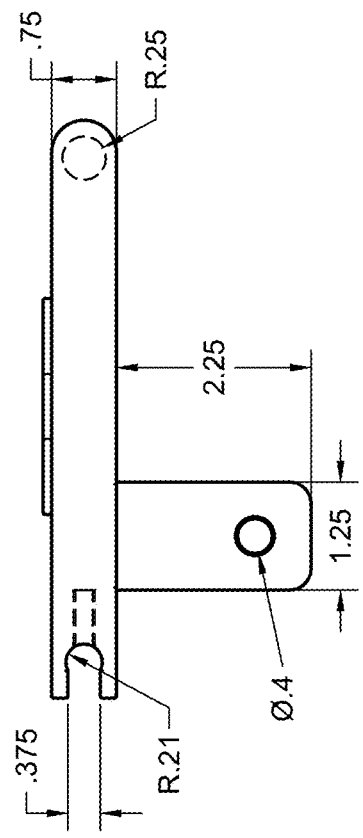
FIG. 15D illustrates a second side view of the implementation of the example handle illustrated in FIG. 15A.
Figure 15B:
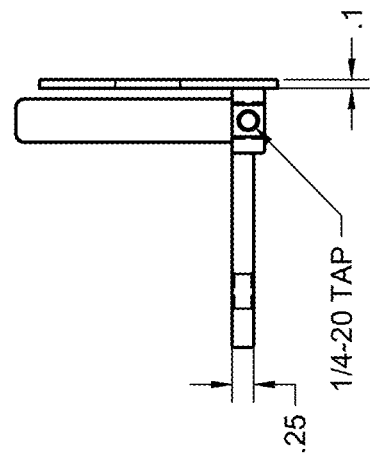
FIG. 15B illustrates a bottom view of the implementation of the example handle illustrated in FIG. 15A.
Figure 15A:
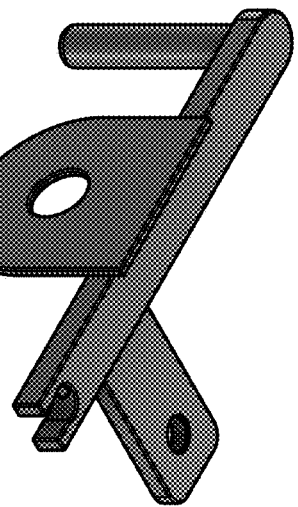
FIG. 15A illustrates a perspective view of the implementation of a handle of an example electronic actuator.

Although FIGS. 1-6 describe an implementation of an example valve assembly, the valve assembly may or may not include these features and/or the valve assembly may include one or more other features. For example, the valve may be any appropriate type of anhydrous ammonia valve. The valve may include other types of valve disks, as illustrated in FIGS. 6 and 12. The valve may include a flat or rounded valve disk assembly, such as where the second part 14 of the valve is flat or rounded. As illustrated, the valve may include a tapered valve disk assembly (e.g., a first part 13 and a second tapered part 14). The tapered valve disk assembly in combination with the electronic actuator may increase laminar flow from hoses attached to the valve. By increasing laminar flow from the hose, providing a secure open position for the valve (e.g., via the electromagnetic connection holding the valve open), and by increasing safety (e.g., by providing a switch to allow emergency shut off), an operator may be capable of driving 10 miles an hour during common field applications as opposed to 5 miles an hour with conventional anhydrous ammonia safety valves.

The valve may include any appropriate valve for anhydrous ammonia including, but not limited to spring valves, safety valves, excess flow valves, bulkhead valves, etc. In some implementations, the valve may be a spring valve that includes a spring (not shown) that retains a valve in a closed position such that when a valve is released from an open position, the valve automatically returns to the closed position (e.g., via the spring). For example, opening the valve may expand the spring and when the force retaining the valve in an open position is released (e.g., electromagnetic is not magnetic and/or has a magnetic force less than the force applied by the spring), the spring may return to return to an initial state (e.g., less expanded state) and close the valve. In anhydrous ammonia tanks, use of spring valves may ensure closure and/or complete closure when disposing the valve in the closed position (e.g., since the force from the spring may fully close the tank). In some implementations, the valve may be an excess flow valve and may automatically close based on predetermined valve criteria (e.g., downstream pressure decrease greater than a predetermined amount such as when a hose breaks). Although excess flow valves may provide some protection against excess flows, in anhydrous ammonia applications, the use of the electronic actuator may inhibit other types of leaks. In some implementations, the described valves may be used in line with hoses and/or with tanks.

The valve may include any appropriate feature such as riser protection (e.g. in case of valve pull away from the tank), fire fuse, sensor (e.g., ammonia sniffer), fail-safe feature, etc. For example, the valve may include a fire fuse such that the valve may automatically close in the presence of a predetermined length of a predetermined elevated temperature (e.g., fire). One or more of the safety features may shut off the valve independently and/or in conjunction with the described valve assembly emergency shut off (e.g., when the switch is triggered in an emergency scenario). For example, a fire fuse in a valve may close the valve independently of the switch. As another example, a riser protection may be coupled to the switch such that it is capable of removing or cutting the power delivered to the electromagnetic component.

The electronic actuator may be capable of opening and/or closing the valve in some implementations. For example, the magnetic field generated by the electromagnet may be strong enough to attract the attractive component of the handle and adjust the handle to the first position to open the valve (e.g., the magnetic field may create a force greater than the force applied by the spring and/or spring of the latch).

In various implementations, the power source may be coupled to the electronic actuator. For example, a battery may be disposed proximate the valve and/or electronic actuator and coupled to the electromagnet. The battery may be disposed in and/or proximate the plate of the bracket. The battery, in some implementations may be associated with a vehicle (e.g., vehicle battery) and/or trailer pulling a tank on which the electronic actuator is coupled. The switch may be coupled to the battery and/or electromagnet (e.g., wirelessly and/or wired connection). The switch may then control whether power is provided to the electromagnet.

In some implementations, the handle may or may not include a gripper. For example, a user may hold the handle directly (rather than a gripper). The gripper of a handle may or may not be disposed proximate an end of the stem of the handle. The gripper may be removably coupled to the stem such that different styles of grippers may be utilized (e.g., bar, bar with cushioning, t-shaped bar, etc.) The gripper may be repositionable on the stem. For example, the gripper may be disposed on either a first side or the second opposing side of the stem, in some implementations. The stem may include an opening through the stem that is capable of receiving at least a portion of the gripper (e.g., via mating threads). The opening may allow the gripper to be coupled such that the gripper extends from the first side or the second side of the stem.

In some implementations, the gripper may have a texture and/or coating (e.g., polymeric, rubber, etc.) to facilitate holding the gripper of the handle. For example, an exterior surface of the gripper may have a texture (in the material of the gripper and/or via a coating) that facilitates gripping the handle when an operator's hands are wet. As another example, the gripper may include a coating (e.g., insulating) that maintains a lower temperature than the stem of the handle (e.g., since exposure to sun may heat the handle to temperatures that are uncomfortable to the touch).

In some implementations, the first locking member may not include the first flange and/or first opening. The first flange and/or the first opening may be utilized as a position for the lock, when not in use (e.g., a resting position), since the placement of a lock in the first opening does not substantially affect the movement of the handle. In some implementations, the first locking member may include other resting positions for locks not in use, such as loops coupled to portions of the electronic actuator, switch, and/or valve.

Any appropriate switch may be utilized with the system. In some implementations, the switch may or may not be a mechanical switch. The operator may pull a cable that disconnects the electrical power source from the electromagnet and/or otherwise breaks the connection. In some implementations, the switch may be controlled by a computer application (e.g., controlled from a phone, tablet, on board vehicle computer, or other computing device). The switch may utilize an ISOBUS communications and/or any other appropriate type of communication.

Figure 7:
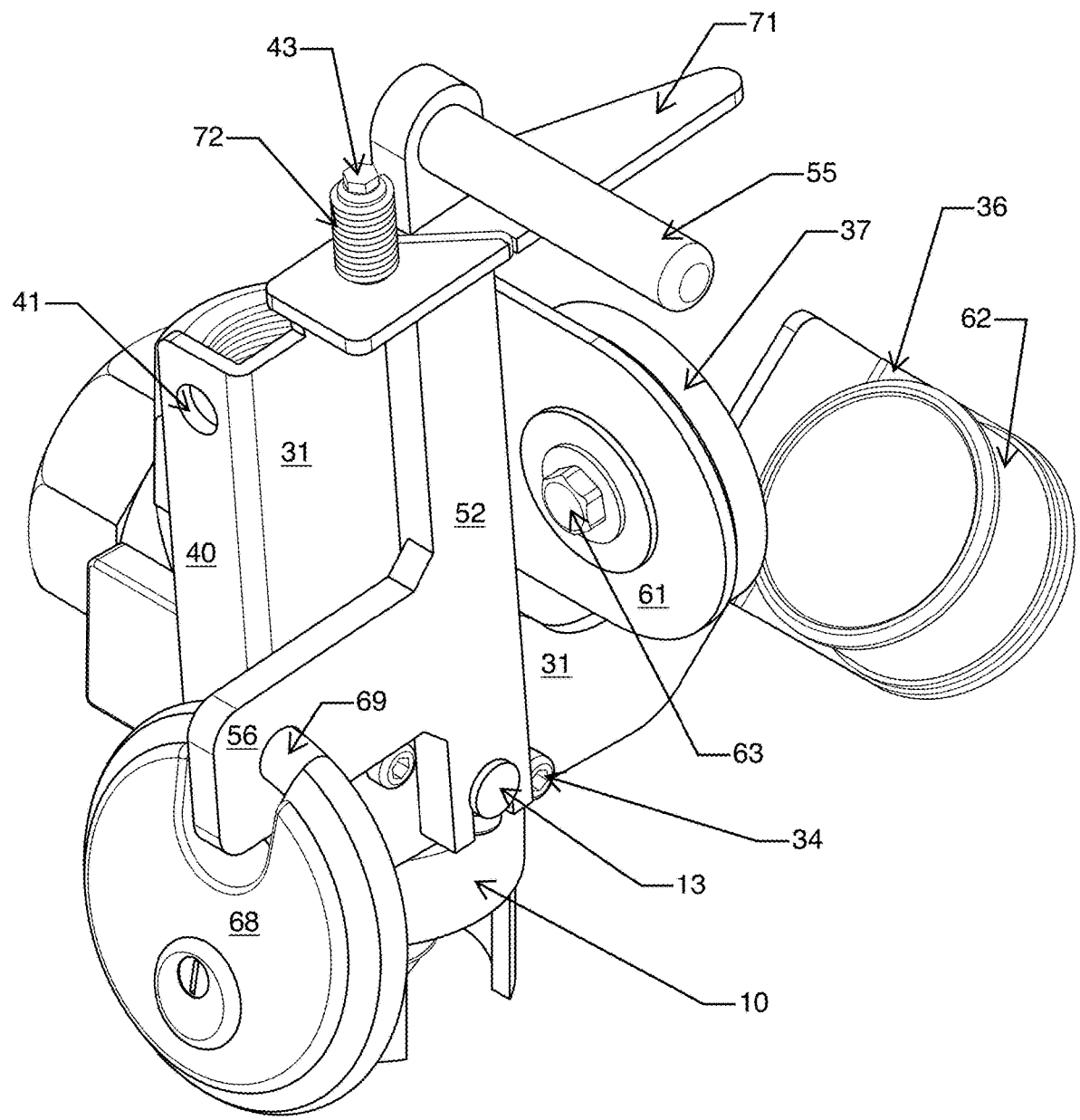
FIG. 7 illustrates a first view of an implementation of an example valve assembly in an open position with a first locking member.
Figure 8:
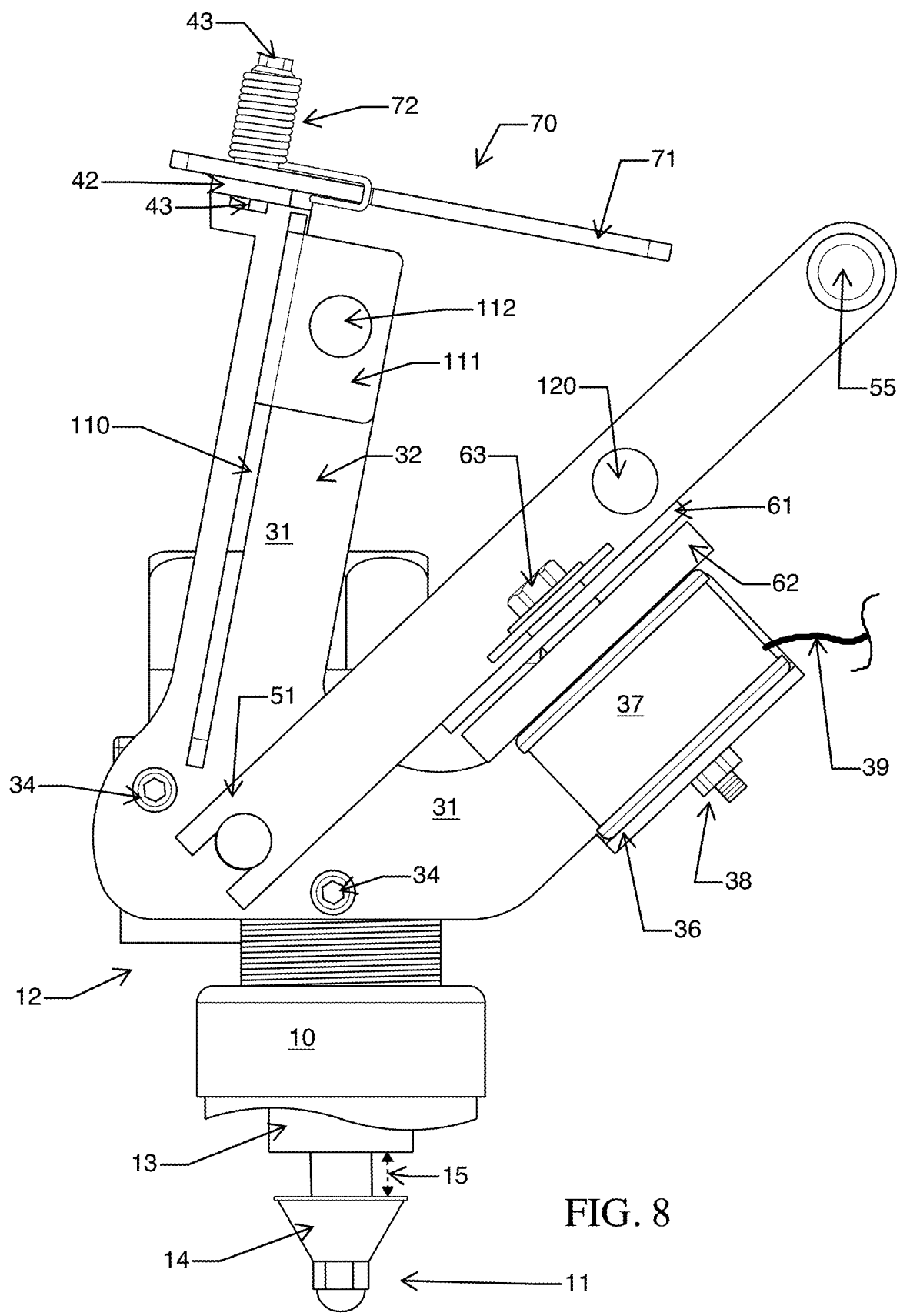
FIG. 8 illustrates a first view of an implementation of an example valve assembly in an open position.

In some implementations, the attractive component on the handle may be an electromagnet component and the attractive component on the bracket may be attracted to the electromagnetic component (e.g., when the electromagnetic component has power). For example, as illustrated in FIG. 7, the handle may include an electromagnet component 37 and the bracket may include the attractive component 62. Thus, the switch may be coupled to the electromagnet component of the handle. To open the valve, the handle may be moved to an open position and power may be provided to the electromagnet component 37. The electromagnet component (e.g., when power is provided) of the handle may couple with the attractive component in the bracket to maintain the handle and thus the valve in the open position.

In some implementations, the power source for the electromagnetic component may be coupled to the bracket. For example, a battery, such as a 12V battery may operate the electromagnet and a battery case may be provided on the bracket such that a battery may be coupled to the bracket. In some implementations, the electromagnetic component may be solar powered. For example, a solar panel may be mounted proximate the valve, such as on a tank, to provide power to the electromagnetic component.

In some implementations, a non-electromagnetic attractive component based device may be utilized (e.g., a non-electromagnetic attractive component may be disposed on the bracket and/or handle instead of the electromagnet component). For example, the attractive components may include a magnetic component that can be broken by a user moving the handle and/or a cable pull cord. In some implementations, the attractive components may be coupled such that a cable running to the operator can be pulled to release the attractive components from each other and automatically close the valve.

In some implementations, the bracket may have dimensions such that deformation (e.g., due to an operator leaning on the bracket, rollover of a nurse tank, etc.) is inhibited. For example, the bracket may have a predetermined thickness, which inhibits deformation during use, common accidents and/or common misuses (e.g., weight of a user leaning on bracket, rollover, etc.)

In some implementations, the handle may have a fixed arc through which it pivots (e.g., moves). The movement of the handle may be similar to the movement of the connection member 13 (e.g., the connection member 13 may rotate and the handle coupled to the connection member may rotate). The handle may have a first position, which corresponds to the valve being open. The handle may have a second position, to which it can pivot (e.g., counterclockwise from the first position), corresponding to the valve being closed. The first position and the second position may be approximately the maximum distance between which the handle can pivot. In some implementations, the handle and the valve may be configured such that the valve may be closed prior to the handle reaching the second position (e.g., the handle is capable of being pivoted more counterclockwise after the valve is closed). For example, the valve may fully close at a point in the pivot of the handle between the first position and the second position. In some implementations, the valve may close when the handle is approximately 10 to approximately 40 degrees before the second position. The valve may close when the handle is approximately 35 to approximately 25 degrees from the second position (e.g., approximately 30 degrees). This early close valve assembly may inhibit leaks when the handle is not latched and/or locked (e.g., via one or more of the locking members). Since the valve is closed prior to the handle reaching the second position, minor fluctuations (e.g., due to jostling, failure to lock or latch, etc.) may not cause leaks.

In some implementations, other locking members may be used in addition to and/or in place of the first and/or second locking member. For example, a third locking member may include a loop and/or c-shaped member than is rotatably coupled proximate an end of the bracket. The loop and/or c-shaped member may rotate over the end of the bracket to be disposed over an end of the handle (e.g., an end opposite the connection part of the handle) such that a portion of the handle is disposed in the loop and/or in the C-shaped member to lock the handle in a closed position. When the valve is opened, the loop and/or c-shaped member may be rotated over the end of the handle and over the end of the bracket to release the handle. The third locking member may be utilized instead of the second locking member in some implementations.

Figure 9:
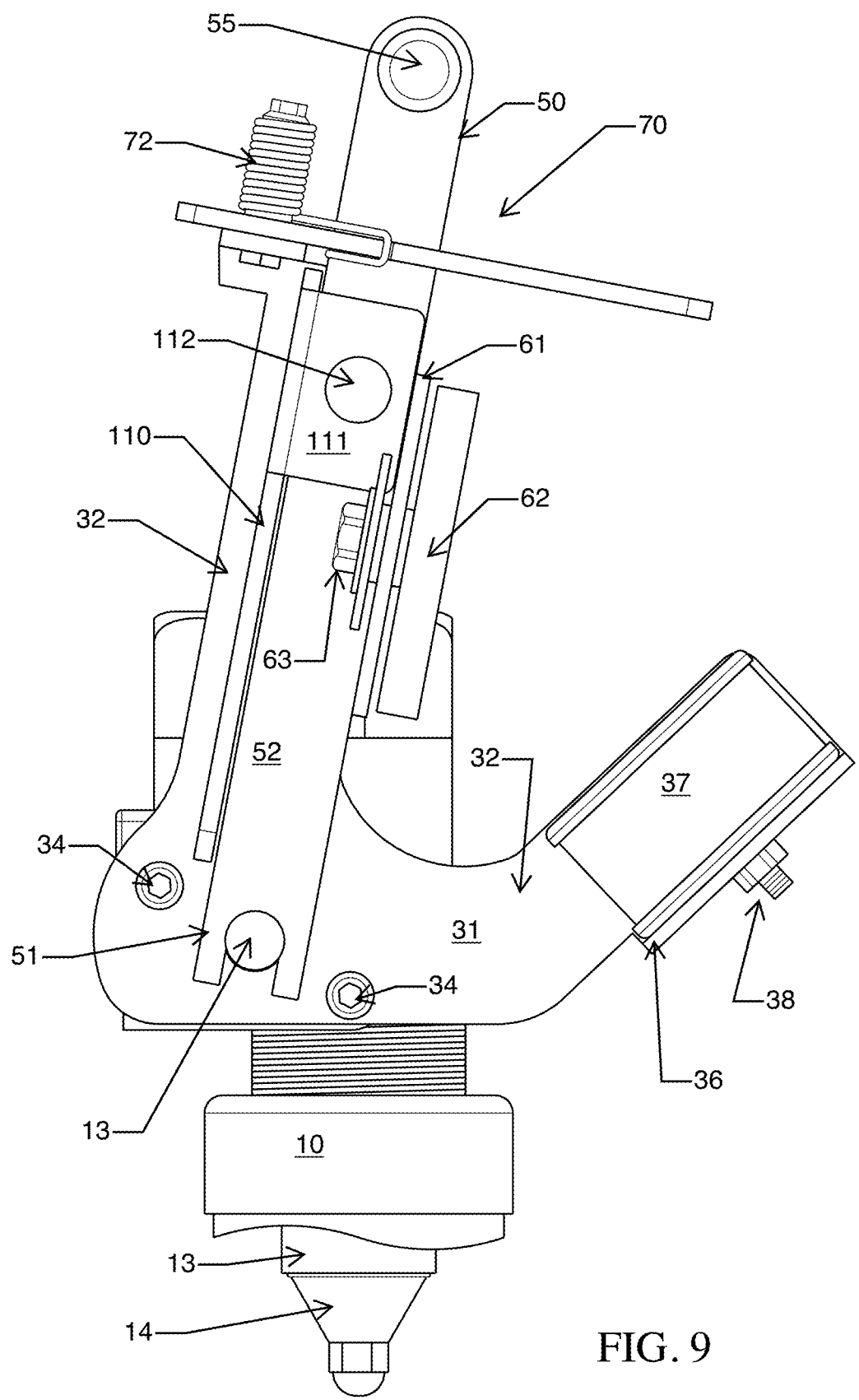
FIG. 9 illustrates a front view of an implementation of the example valve assembly of FIG. 8 in a closed position.
Figure 10:
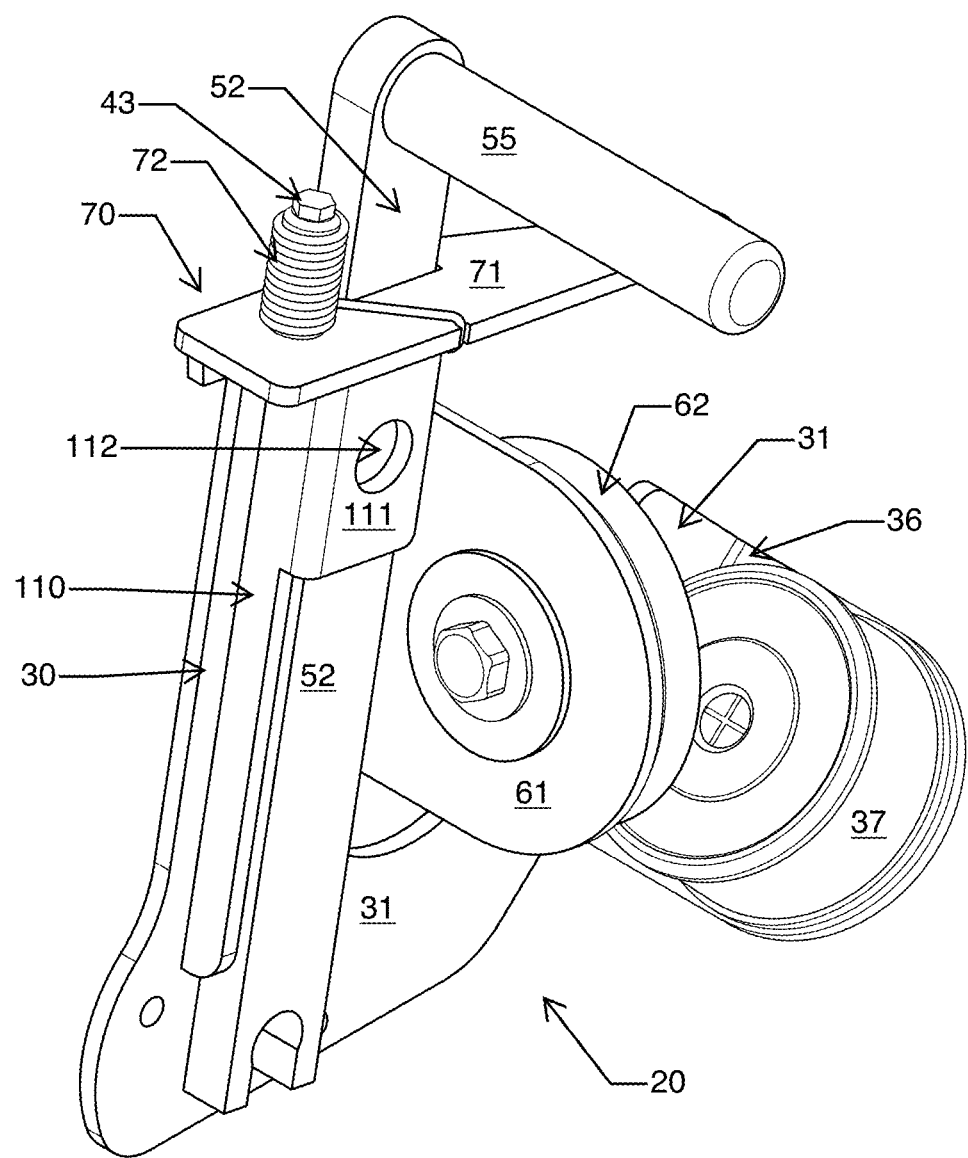
FIG. 10 illustrates a perspective view of an implementation of an example electromagnetic actuator.

In some implementations, an electronic actuator may include a fourth locking member instead of the first locking members. FIGS. 8-13 illustrate an implementation of a valve assembly 100 with a fourth locking member. The fourth locking member may be utilized in place of and/or in addition to other locking members (e.g., second locking member that includes a latch). As illustrated, an electronic actuator 20 may be coupled to a valve 10. The valve may be any appropriate type of anhydrous ammonia valve (e.g., excess flow valve). The electronic actuator 20 may include a bracket 30 coupled to valve and a handle 50 coupled to the valve. The bracket 30 may include a lock flange 110 extending from the first side 52 of the body 51 of the bracket. The lock flange 110 may have a tab 111 extending at an angle from the lock flange 110. As illustrated the lock flange 110 and the tab 111 may form an approximately C-shape with the first side of the bracket. A gap 113 may reside between the tab 11 and the bracket 30. The tab 111 may include a first opening 112 extending through the tab. The handle 50 may include a second opening 120 disposed between the connecting part of the handle and the gripper. When the handle is in the closed position, as illustrated in FIG. 9, the handle may be received in the gap 113 between the tab 111 and the bracket 30. The first opening 112 in the bracket and the second opening 120 in the handle 50 are at least partially aligned when the handle is in the closed position. Then, as illustrated in FIG. 12, a lock 68 may be coupled to the handle and the bracket via the first opening and the second openings. A shackle 69 of the lock 68 may be disposed at least partially in the first opening in the tab of the bracket and the second opening of the handle to lock the handle, and thus the valve, in the closed position. To unlock the handle and thus the valve, the shackle 69 of the lock 68 may be removed from the first opening 112 and the second opening 120. The handle may then be rotated in direction 3 to dispose the handle and the valve in an open position.

In some implementations, the bracket and the handle may have dimensions and/or relative ratios. FIG. 14A-E illustrate various views and approximate dimensions (in inches) of one implementation of an example bracket. FIGS. 15A-D illustrate various views and approximate dimensions (in inches) of one implementation of an example handle that can be used in conjunction with the bracket illustrated in FIGS. 14A-E in an electronic actuator. The dimensions illustrated in FIGS. 14A-E and 15A-D, illustrate one implementation of example dimensions and ratios of dimensions (e.g., between portions and complementary handle and bracket) that can be utilized in the valve assembly as described.

In various implementations, to open a valve, power may be provided to an electromagnetic component (e.g., by the switch) and the handle may be released from a second locking member (e.g., by applying a force greater than the force applied by the spring of the latching mechanism to rotate the latch from its initial position). The second locking member may return to its initial position once the handle is past a position of contact with the latching mechanism. The handle may then be rotated from a first closed position to a second open position. As the handle rotates, the valve may be opened (e.g., via connection member 13). As the handle is rotated, the attractive component of the handle may be attracted to the magnetic field of the electromagnetic component and couple with the electromagnetic component when the handle is in the second open position and/or at a distance from the electromagnetic component (e.g., proximate to the second open position). In some implementations, the electromagnet component may pull or partially pull the handle (e.g., when released from the second locking member) from the first position to the second position. The electromagnet may retain the handle in the open position (e.g., by coupling with the attractive portion on the handle). The second open position may or may not correspond with a fully open valve position.

In various implementations, to close the valve, the power may be cut off from the electromagnet (e.g., the circuit may be disrupted or opened) by the switch. The electromagnet may become nonmagnetic and release the attractive component, which is no longer attracted to the electromagnet. The spring of the valve may then return to its initial position (e.g., since the force that was applied to the handle is no longer applied) and cause the handle to rotate to the first closed position. The force of the spring may cause the handle to exert enough force on the latching member such that the latch rotates to allow the handle to go to the first open position. Once the handle is in the first open position, the handle may reside in a recess of the latch and not exert a force on the latch. The latch may then return to its initial position and retain the handle in the first position. In some implementations, the latch of the second locking member may be opened (e.g., rotated to an open position) to couple with the handle.

In some implementations, the valve may not include a spring to automatically close the valve, and the handle may be rotated to the closed position to close the valve. The force of the handle impacting the latch of the second locking member may cause the latch to rotate to open the second locking member. In some implementations, the latch of the second locking member may be opened (e.g., rotated to an open position) to couple with the handle. The latch may then (e.g., automatically) move to a closed position and receive the handle to lock the handle.

In some implementations, the valve may be locked by disposing a lock in an opening in the handle of the electronic actuator, which inhibits the movement of the handle (e.g., since the lock itself will contact the bracket of the actuator in this position and inhibit movement of the handle to an open position). To release the lock, the lock may be removed from this opening in the handle and may or may not be disposed in an opening of the bracket (e.g., that does not inhibit movement of the handle).

In various implementations, an anhydrous ammonia nurse tank valve assembly may include an anhydrous ammonia valve, an electronic actuator, and a switch to operate the electronic actuator. The anhydrous ammonia valve may include comprises at least one open position and a closed position. The closed position may inhibit flow of the anhydrous ammonia through the valve. The valve may include a spring (e.g., a spring actuated valve). The electronic actuator may be coupled to the valve and may be capable adjusting the position of the valve. The electronic actuator may include a bracket and a handle. The bracket may be coupled to the valve. The bracket may include an electromagnet and a first flange. The electromagnet may be coupled to an electrical source. The electromagnet may extend in a first direction away from a body of the bracket. The first flange may extend in a second direction away from the body of the bracket such that the first flange and the electromagnet are not disposed on the same side of the bracket. The first flange may include a first opening capable of receiving a first lock. The switch of the valve assembly may be coupled to the electromagnet. The switch may include an on position, which allows power to be provided from the electrical source to the electromagnet to allow the electromagnet to be magnetic, and an off position, which inhibits power from the electrical source to be provided to the electromagnet and allows the electromagnet to be non-magnetic. The handle of the bracket may include a connection portion pivotably coupled to the valve such that the handle can be rotated from a first position in which the valve is disposed in one of the open positions to a second position in which the valve is disposed in the closed position (e.g., and vice versa). The spring of the valve is extended when the handle opens the valve. The handle may include a stem extending from the connection portion of the handle. The stem may include a first side proximate the bracket and a second opposing side. The stem may include one or more grippers extending from the second side of the stem of the handle. The gripper may facilitate holding and/or movement of the handle. The stem may include an attractive component extending from the second side of the body of the handle. The attractive component may be disposed on the stem between the gripper and the connection portion, in some implementations. The attractive component may couple with the electromagnet in the bracket when the electromagnet is magnetic (e.g., to inhibit closure of the valve). The stem may include a second flange opening extending from a side between the first side and the second side of the stem of the handle. The second flange of the handle may be disposed between the connection portion and the gripper of the handle. The second flange may have a length such that when the handle is disposed in the first position, the second flange may extend beyond the body of the bracket. The second flange may include a second opening that is disposed through the second flange and/or configured to receive the first lock. The first opening of the first flange of the bracket may be configured such that disposing the first lock in the first opening does not inhibit movement of the handle. The second opening of the second flange of the bracket may be configured such that disposing the first lock in the second opening allows the first lock to contact the bracket and inhibit the handle from moving to the first position. The valve assembly may include a second lock coupled to the bracket. The second lock may include a spring loaded latch capable of inhibiting release of a handle received by the spring loaded latch. The spring loaded latch may be capable of releasing the handle to allow the handle to move to the first position. The spring loaded latch may be configured to move to receive the handle when the spring of the valve moves the handle to the second position due to the release of the attractive member of the handle by the electromagnet and then by force of the spring of the spring load latch may receive and inhibit movement of the handle. When the attractive component of the handle and the electromagnet of the bracket are coupled, the valve may be disposed in the open position. When power is removed from the electromagnet, the spring of the valve may cause the handle to rotate to the second position and may close the valve.

Implementations may include one or more of the following features. The anhydrous ammonia valve may include an anhydrous ammonia emergency shut off valve and/or an excess flow valve. The anhydrous ammonia valve may include a fire fuse configured to allow the valve to close when the fire fuse is exposed to fire for a predetermined amount of time. The valve assembly may include first lock disposable in the second opening of the handle to inhibit movement of the handle and disposable in the first opening of the handle.

In various implementations, an electronic actuator may be coupled to an anhydrous ammonia valve. The electronic actuator may allow flow to the valve to be shut off (e.g., closed). The electronic actuator may include a bracket and a handle. The bracket may be coupleable to the valve. The bracket may include one or more electromagnets extending in a first direction away from a body of the bracket. The electromagnet(s) may be coupled to an electrical source. The handle may include a connection portion pivotably coupleable to the valve such that handle can be rotated from a first position in which the valve is disposed in one of the open positions to a second position in which the valve is disposed in the closed position. A spring of the valve may be extended when the handle opens the valve (e.g., such that when the force is released from the spring, the spring may return to an initial position and drawn the valve closed automatically). The handle may include a stem, a gripper extending from the stem, and an attractive component extending from a second side of the stem. The stem may extend from the connection portion of the handle and include a first side proximate the bracket and a second opposing side. The attractive component may be disposed on the stem between the gripper and the connection portion. The attractive component may couple with the electromagnet in the bracket to inhibit closure of the valve, when the electromagnet is magnetic. The stem may include a second flange extending from a side between the first side and the second side of the body and/or disposed between the connection portion of the handle and the gripper. The second flange may have a length such that when the handle is disposed in the first position, the second flange may extend beyond the body of the bracket. The second flange may include a second opening disposed through the second flange and configured to receive the first lock. The second opening of the second flange of the bracket may be configured such that disposing the first lock in the second opening allows the first lock to contact the bracket and inhibit the handle from moving to the first position. When the attractive component of the handle and the electromagnet of the bracket are coupled, the valve may be disposed in the open position. When power is removed from the electromagnet, the spring of the valve may cause the handle to rotate to the second position and may close the valve.

Implementations may include one or more of the following features. The stem of the handle may receive the gripper on the first side or the second side of the stem. The electronic actuator may include a switch coupled to the electromagnet. The switch may include an on position, which allows power to be provided from the electrical source to the electromagnet to allow the electromagnet to be magnetic, and/or an off position, which inhibits power from the electrical source to be provided to the electromagnet and allows the electromagnet to be non-magnetic. The switch may or may not be remote to the valve and electronic actuator. The valve may be in a closed position prior to the handle being disposed in the second position (e.g., approximately 30 degrees prior to the second position of the handle). The attractive component may include ferromagnetic material and/or other materials attracted to magnetic fields. The electronic actuator may include one or more additional locking members. For example, a second lock may be coupled to the bracket. The second lock may include a spring loaded latch capable of inhibiting release of a handle received by the spring loaded latch. The spring loaded latch may be capable of releasing the handle to allow the handle to move to the first position. The spring loaded latch may be configured to move to receive the handle when the spring of the valve moves the handle to the second position due to the release of the attractive member of the handle by the electromagnet and then by force of the spring of the spring load latch receive and inhibit movement of the handle. The electronic actuator may be coupleable to the valve of an anhydrous ammonia storage tank and/or an anhydrous ammonia nurse tank. The bracket may include a first flange extending in a second direction away from the body of the bracket such that the first flange and the electromagnet are not disposed on the same side of the bracket. The first flange may include a first opening capable of receiving a first lock. The first opening of the first flange of the bracket may be configured such that disposing the first lock in the first opening does not inhibit movement of the handle. The first opening of the bracket may be a resting point for a lock when the lock is not in use (e.g., when the lock is not locking the valve) that does not inhibit movement of the handle and thus does not inhibit safety features such as activation via a switch.

In various implementations, an electronic actuator may be coupled to an anhydrous ammonia valve. The electronic actuator may to shut off flow to the valve. The electronic actuator may include a bracket and a handle. The bracket and/or the handle may be coupleable to the valve. The bracket may include one or more electromagnets. The electromagnet maybe coupled to an electrical source and/or may extend in a first direction away from a body of the bracket. The handle may include a connection portion pivotably coupleable to the valve such that the handle can be rotated from a first position in which the valve is disposed in one of the open positions to a second position in which the valve is disposed in the closed position. A spring of the valve may be extended when the handle opens the valve. The handle may include a stem and a gripper extending from a second side of the stem of the handle. The stem may extend from a connection portion of the handle and may include a first side proximate the bracket and a second opposing side. The handle may include an attractive component extending from the second side of the body of the handle. The attractive component may be disposed on the stem between the gripper and the connection portion. The attractive component may couple with the electromagnet in the bracket to inhibit closure of the valve, when the electromagnet is magnetic. The electronic actuator may include a lock coupled to the bracket. The lock may include a spring loaded latch capable of inhibiting release of a handle received by the spring loaded latch. The spring loaded latch may be capable of releasing the handle to allow the handle to move to the first position. The spring loaded latch may be configured to move to receive the handle when the spring of the valve moves the handle to the second position due to the release of the attractive member of the handle by the electromagnet and then by force of the spring of the spring load latch receive and inhibit movement of the handle. When the attractive component of the handle and the electromagnet of the bracket are coupled, the valve may be disposed in the open position. When power is removed from the electromagnet, the spring of the valve may cause the handle to rotate to the second position and close the valve.

Implementations may include one or more of the following features. The bracket may include a first flange extending in a second direction away from the body of the bracket such that the first flange and the electromagnet are not disposed on the same side of the bracket. The first flange may include a first opening capable of receiving a first lock. The handle may include a second flange extending from a side between the first side and the second side of the body and disposed between the connection portion of the handle and the gripper. The second flange may have a length such that when the handle is disposed in the first position, at least a portion of the second flange may extend beyond the body of the bracket. The second flange may include a second opening disposed through the flange and configured to receive at least a portion of a lock. The first opening of the first flange of the bracket may be configured such that disposing the first lock at least partially in the first opening does not inhibit movement of the handle. The second opening of the second flange of the bracket may be configured such that disposing the first lock at least partially in the second opening allows the first lock to contact the bracket and inhibit the handle from moving to the first position. In some implementations, the attractive component may include one or more ferromagnetic materials. The electronic actuator may be coupled to the valve of an anhydrous ammonia nurse tank and/or an anhydrous ammonia storage tank. The electronic actuator may include a switch coupled to the electromagnet. The switch may include an on position, which allows power to be provided from the electrical source to the electromagnet to allow the electromagnet to be magnetic, and/or an off position, which inhibits power from the electrical source to be provided to the electromagnet and allows the electromagnet to be non-magnetic.

In various implementations, the electronic actuator may be coupled to a valve (e.g., existing valve and/or new valve). The valve may include a connection member that extends through the valve housing to an exterior of the valve housing. Rotation of the connection member may adjust the position of the valve (e.g., open and/or closed positions). The bracket of the electronic actuator may include openings through which fasteners may be at least partially disposed to couple the bracket to the valve (e.g., a valve housing). The bracket may include an opening through which the connection member of the valve may pass. The handle may be coupled to the bracket (e.g., precoupled and/or coupled after coupling the bracket to the valve). The handle of the electronic actuator may include a connecting portion that is capable of receiving the connection member and coupling with the connection member such that when the handle moves (e.g., rotates), the connection member of the valve rotates.

In various implementations, the described system and processes may be utilized in emergency shut off operations. For example, an operator may actuate the switch (e.g., switch in off position; pull a cable of the switch, etc.) to remove power from the electromagnet of the electronic actuator. When power is removed from the electromagnet, the electromagnet and the attractive component are uncoupled and the spring of the valve may cause the handle to rotate into the second position and close the valve.

Although the attractive components and portions thereof have been illustrated as approximately cylindrical, the attractive components and portions thereof may be any appropriate size and/or shape. Although the openings (e.g., in the bracket and/or handle) have been illustrated as including a circular cross-section, any appropriate regular or irregular shape may be utilized, such as oval, rectangular, etc.

In various implementations, couplings may include threads, openings and fasteners, quick connectors, other coupling facilitators, etc. as appropriate. For example, the valve may include openings with threads to receive hoses (e.g., receive threads from connectors of the hose) and/or couple with a tank. As another example, the hose may couple to a valve via a quick connector. The coupling may be direct and/or indirect, as appropriate. For example, a connector may be utilized to couple hoses and valves. The connector may allow different size hose(s) to be coupled with a valve.

In some implementations, the use of the electronic actuator is described in some implementations as with a spring valve. For example, a valve in which a spring in an initial position holds the valve in a closed position and when a force is applied to a handle of the valve, the spring is extended as the valve is opened. When this force is released, the spring of the valve may automatically return the valve to a closed position. The spring may be selected such that the force of the spring returning to the initial position is capable of closing the valve. In some implementations, the spring of the valve may be compressed when the valve is opened by the movement of the handle of the valve. When the force is released from the handle the compressed spring may return to its initial position and this resulting force may cause the valve to return to a closed position.

Although valves with springs that return the valve to closed positions have been described, the electronic actuator may be utilized with springs that return to the open position (e.g., the spring-loaded to stay open). These spring open-type valves may be utilized in applications where shutting off anhydrous ammonia can cause dangerous situations (e.g., build up in pressure and/or concentration of anhydrous ammonia). A user may rotate the handle of the electronic valve to close the valve and/or may utilize the switch to trigger an automatic opening of the valve. For example, electricity may be provided to the electromagnet and the handle may be rotated to cause the attractive component of the handle and the electromagnet of the bracket to be coupled. The switch may cut off power to the electromagnet, which releases the handle and opens the valve in this type of spring open type valve.

In some implementations, the valve may not be a spring valve. The electronic actuator may include a spring to perform one or more of the operations of a spring of a valve, automatically closing or opening the valve when a force to a valve handle (e.g., that opens or closes the valve) is removed. In some implementations, a spring may be coupled to the handle (e.g., between the bracket and the spring) such that the spring is extended or compressed to when the handle is moved between an initial position and another position by an application of force (e.g., by a user). For example, a spring (e.g., different from the spring of the second locking member) of the electronic actuator may be compressed or expanded to open the valve. As another example, the spring may be compressed or expanded to close the valve. The coupling of the attractive components (e.g., attractive component and electromagnet) may inhibit movement from this position once the force is released, in some implementations. When the power is removed from the electromagnet, the attractive components may be uncoupled and the spring (e.g., when returning to the initial position) may drive the handle be released the initial position. Thus, the electronic actuator may be coupled and utilized in non-spring valves (e.g., to allow emergency shut-off).

The described valve assemblies may be utilized in agricultural and/or industrial settings. For example, the valve assemblies may be utilized in nurse tank(s). An operator may drive a vehicle coupled to one or more nurse tanks with one or more of the described valve assemblies. The valve assemblies may feed anhydrous ammonia from the nurse tanks to field applicator(s). In some implementations, one or more of the described valve assemblies may be utilized in storage tanks (e.g., in industrial and/or agricultural settings). The valve assemblies may be utilized to feed anhydrous ammonia from the storage tank to smaller tanks (e.g., nurse tanks, consumer tanks, tanks on vehicles, etc.). In some implementations, the described valve assemblies may be utilized in blending facilities (e.g., with aqueous ammonia). The safety of the operation may be increased and/or costs of operation may be decreased by use of the described valve assemblies.

The described processes may be implemented by the various described systems, such as systems 1 and 100. In addition, various operations may be added, deleted, and/or modified. In some implementations, the process may be performed in combination with other processes and/or portions thereof. For example, based on which type(s) of locking members are provided, one or more of the operations may be performed to lock and/or unlock a valve assembly. As another example, more than one type of emergency shut offs operation may be implemented approximately concurrently/or sequentially. For example, during a fire, one or more tanks may be shut off via the associated switch(es) and/or fire fuse(s) in a valve may shut off a valve. As another example, a switch may be coupled to one or to more than one valve. The switch may thus operate a single tank and/or more than one tank in conjunction and/or separately.

In some implementations, a switch (e.g., coupled to the electromagnetic component and/or power source of the electromagnetic component) may control more than one tank. The switch may be any appropriate mechanical, electronic, and/or software switch.

Although users have been described as a human, a user may be a person, a group of people, a person or persons interacting with one or more computers, and/or a computer system.

It is to be understood the implementations are not limited to particular systems or processes described which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise. Thus, for example, reference to "an electromagnet" includes a combination of two or more magnet and reference to "a valve" includes different types and/or combinations of valves. As another example, a reference to a ferromagnetic material includes different types and/or combinations of ferromagnetic material. As another example reference to an attractive component may include different types and/or combinations of attractive components. As another example, a power source may include different types and/or combinations of power sources.

Although the present disclosure has been described in detail, it should be understood that various changes, substitutions and alterations may be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. An electronic actuator coupleable to an anhydrous ammonia valve to shut off flow to the valve, the electronic actuator comprising:
    a bracket coupleable to the valve, wherein the bracket comprises:
        an electromagnet, and wherein the electromagnet is coupled to an electrical source, and wherein the electromagnet extends in a first direction away from a body of the bracket;
        a first flange extending away from the body of the bracket such that the first flange and the electromagnet are not disposed on the same side of the bracket; wherein the first flange comprises a first opening capable of receiving a first lock; and wherein the first opening of the first flange of the bracket is configured such that disposing the first lock at least partially in the first opening does not inhibit movement of the handle;
    a handle, wherein the handle comprises:
        a connection portion pivotably coupleable to the valve, wherein the handle is rotatable from a first position in which the valve is disposed in one of the open positions to a second position in which the valve is disposed in the closed position, and wherein a spring of the valve is extended when the handle opens the valve; and wherein the handle comprises:
        a stem extending from the connection portion of the handle, wherein the stem comprises a first end proximate the connection portion and a second opposing end; wherein the stem comprises:
            a first side proximate the bracket;
            a second opposing side; and
            a third side disposed between the first side and the second side;
            an attractive component extending from the second side of the body of the handle; wherein the attractive component is disposed on the stem between the second end of the stem and the connection portion; and wherein the attractive component couples with the electromagnet in the bracket to inhibit closure of the valve, when the electromagnet is magnetic; and
        a second flange extending from the third side and disposed between the connection portion of the handle and the second end of the stem; and wherein the second flange has a length such that when the handle is disposed in the first position, at least a portion of the second flange extends beyond the body of the bracket; and wherein the second flange comprises a second opening disposed through the second flange; and wherein the second opening is configured to receive at least a portion of the first lock; and wherein the second opening of the second flange is configured such that disposing first lock at least partially in the second opening allows the first lock to contact the bracket and inhibit the handle from moving to the first position; and
    a locking member coupled to the bracket; wherein the locking member comprises a spring loaded latch capable of receiving at least a portion of the handle; and wherein the spring loaded latch is capable of releasing the handle to allow the handle to move to the first position;
    and wherein when the attractive component of the handle and the electromagnet of the bracket are coupled, the valve is disposed in the open position;
    and wherein when power is removed from the electromagnet, the spring of the valve causes the handle to rotate to the second position and close the valve; and wherein the spring loaded latch is configured to move to receive the handle when the spring of the valve rotates the handle to the second position due to the release of the attractive member of the handle by the electromagnet and then by force of the spring of the spring load latch receive and inhibit movement of the handle.

2. The electronic actuator of claim 1 wherein the attractive component comprises ferromagnetic material.

3. The electronic actuator of claim 1 wherein the electronic actuator is coupled to the valve of an anhydrous ammonia nurse tank.

4. The electronic actuator of claim 1 wherein the valve comprises an excess flow valve.

5. The electronic actuator of claim 1 wherein the electronic actuator is coupled to the valve of an anhydrous ammonia storage tank.

6. The electronic actuator of claim 1 further comprising a switch coupled to the electromagnet, wherein the switch comprises:
    an on position that allows power to be provided from the electrical source to the electromagnet to allow the electromagnet to be magnetic; and
    an off position that inhibits power from the electrical source to be provided to the electromagnet and allows the electromagnet to be non-magnetic.

7. The electronic actuator of claim 1 further comprising a gripper extending from the stem of the handle; and wherein the stem is configured to receive the gripper on the first side or the second side of the stem.

8. An electronic actuator coupleable to an anhydrous ammonia valve to shut off flow to the valve, the electronic actuator comprising:

a bracket coupleable to the valve, wherein the bracket comprises:
  a first attractive member extending in a first direction away from a body of the bracket;
a handle, wherein the handle comprises:
  a connection portion pivotably coupleable to the valve; wherein the handle is rotatable from a first position in which the valve is disposed in one of the open positions to a second position in which the valve is disposed in the closed position, and wherein a spring of the valve is extended when the handle opens the valve and wherein the handle comprises:
    a stem extending from the connection portion of the handle; wherein the stem comprises a first end proximate the connection portion of the handle and a second opposing end; wherein the stem comprises:
      a first side proximate the bracket;
      a second opposing side; and
      a third side disposed between the first side and the second side;
    a second attractive component extending from the second side of the stem of the handle; wherein the second attractive component is disposed between the first end and the second end of the stem; and
    a first flange extending from the third side and disposed between the first end and the second end of the stem; and wherein the first flange has a length such that when the handle is disposed in the first position, the first flange at least partially extends beyond the body of the bracket; and wherein the first flange comprises a first opening disposed through the first flange; and wherein the first opening is configured to receive the at least a portion of a first lock; and wherein the first opening of the first flange of the bracket is configured such that disposing a first lock at least partially in the first opening allows the first lock to contact the bracket and inhibit the handle from moving to the first position;
and wherein at least one of the first attractive component or the second attractive component comprises an electromagnet, and wherein the electromagnet is coupled to an electrical source such that the electromagnet is magnetic when power is delivered from the electrical source to the electromagnet;
and wherein when power is provided to the electromagnet, the second attractive component of the handle and the first attractive of the bracket are coupled and the valve is disposed in the open position; and wherein when the the second attractive component couples with the first attractive component of the bracket closure of the valve is inhibited;
and wherein when power is removed from the electromagnet, the second attractive component of the handle and the first attractive component of the bracket are uncoupled, and a spring of the valve causes the handle to rotate to the second position and close the valve.

9. The electronic actuator of claim 8 further comprising an additional flange extending away from the body of the bracket such that the additional flange and the first attractive component are not disposed on the same side of the bracket; wherein the additional flange comprises a second opening capable of receiving at least a portion of the first lock; and wherein the second opening of the additional flange of the bracket is configured such that disposing the first lock at least partially in the second opening does not inhibit movement of the handle.

10. The electronic actuator of claim 8 further comprising a gripper extending from the stem of the handle; and wherein the stem is configured to receive the gripper on the first side or the second side of the stem.

11. The electronic actuator of claim 8 further comprising a switch coupled to the electromagnet, wherein the switch comprises:
  an on position that allows power to be provided from the electrical source to the electromagnet to allow the electromagnet to be magnetic; and
  an off position that inhibits power from the electrical source to be provided to the electromagnet and allows the electromagnet to be non-magnetic.

12. The electronic actuator of claim 11 wherein the switch is remote to the valve and electronic actuator.

13. The electronic actuator of claim 8 wherein the valve is closed prior to the handle fully rotating to the second position from the first position.

14. The electronic actuator of claim 8 wherein at least one of the first attractive component or the second attractive component comprises ferromagnetic material.

15. The electronic actuator of claim 8 further comprising a locking member coupled to the bracket, wherein the locking member comprises a spring loaded latch capable of inhibiting release of a handle received by the spring loaded latch, and wherein the spring loaded latch is capable of releasing the handle to allow the handle to move to the first position, and wherein the spring loaded latch is configured to move to receive the handle when the spring of the valve moves the handle to the second position due to the release of the attractive member of the handle by the electromagnet and then by force of the spring of the spring load latch receive and inhibit movement of the handle.

16. The electronic actuator of claim 8 wherein the electronic actuator is coupled to the valve of an anhydrous ammonia nurse tank.

17. A method of operating a nurse tank valve of an anhydrous ammonia nurse tank, the method comprising:
  removing power from an electromagnet of an electronic actuator such that the electromagnet and the attractive member are uncoupled, wherein the electronic actuator comprises:
    a bracket coupled to the valve, wherein the bracket comprises:
      an electromagnet extending in a first direction away from a body of the bracket;
    a handle, wherein the handle comprises:
      a connection portion pivotably coupleable to the valve; wherein the handle is rotatable from a first position in which the valve is disposed in one of the open positions to a second position in which the valve is disposed in the closed position, and wherein a spring of the valve is extended when the handle opens the valve and wherein the handle comprises:
        a stem extending from the connection portion of the handle; wherein the stem comprises a first end proximate the connection portion of the handle and a second opposing end; wherein the stem comprises:
          a first side proximate the bracket;
          a second opposing side; and
          a third side disposed between the first side and the second side;
        an attractive component extending from the second side of the stem of the handle; wherein the attractive component is disposed between the first end and the second end of the stem;

allowing the handle of the electronic actuator to rotate from the first position to the second position once the electromagnet and the attractive component are uncoupled, wherein uncoupling the electromagnet and the attractive component removes the force extending the spring of the valve and causes the spring of the valve rotate the handle by acting on a connection member of the valve that is coupled to the handle; and locking the valve assembly by disposing a lock at least partially in a first opening disposed through a first flange of the electronic actuator, wherein the first flange extends from a third side of the stem and is disposed between the first end and the second end of the stem; and wherein the first flange has a length such that when the handle is disposed in the first position, the first flange at least partially extends beyond the body of the bracket; and wherein the first opening of the first flange of the bracket is configured such that disposing a first lock at least partially in the first opening allows the first lock to contact the bracket and inhibit the handle from moving to the first position.

18. The method of claim 17 wherein allowing the handle of the electronic actuator to rotate from the first position to the second position further comprises:

allowing a latch of a spring loaded locking member to rotate in a first direction to allow the handle to move to the second position, wherein a force exerted by the spring of the valve moves the handle to contact the latch and cause the rotation in the first direction; and automatically rotating the latch in a second opposing direction once the handle is in the first position via a spring of the spring load locking member; wherein the latch is configured to receive the handle and inhibit movement of the handle from the second position.

19. The method of claim 17 further comprising:

releasing a handle of an electronic actuator from a spring loaded locking member by rotating the locking member, wherein the electronic actuator is coupled to a valve of an anhydrous ammonia nurse tank;

rotating the handle of the electronic actuator to first position from a second position, wherein when the handle is in the first position the valve is open, and wherein the valve is closed when the handle is in the second position;

providing power to an electromagnet of the electronic actuator such that the electromagnet couples with the attractive member of the electronic actuator, wherein the coupling of the electromagnet and the attractive member of the electronic actuator inhibits rotation of the handle and closure of the valve.

20. The method of claim 19 further comprising:

disposing the first lock in a resting position in the electronic actuator, wherein the electronic actuator further comprises an additional flange extending away from the body of the bracket such that the additional flange and the first attractive component are not disposed on the same side of the bracket; wherein the additional flange comprises a second opening capable of receiving at least a portion of the first lock;

and wherein disposing the first lock at least partially in the second opening of the additional flange of the bracket does not inhibit movement of the handle.

* * * * *